United States Patent
Koshimizu et al.

(10) Patent No.: US 11,434,384 B2
(45) Date of Patent: Sep. 6, 2022

(54) METHOD FOR MANUFACTURING PRINTED MATERIAL USING LITHOGRAPHIC PRINTING INK, AND LITHOGRAPHIC PRINTING INK SET

(71) Applicant: TORAY INDUSTRIES, INC., Tokyo (JP)

(72) Inventors: Noboru Koshimizu, Otsu (JP); Yuichi Tsuji, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 667 days.

(21) Appl. No.: 16/332,551

(22) PCT Filed: Sep. 25, 2017

(86) PCT No.: PCT/JP2017/034564
§ 371 (c)(1),
(2) Date: Mar. 12, 2019

(87) PCT Pub. No.: WO2018/062108
PCT Pub. Date: Apr. 5, 2018

(65) Prior Publication Data
US 2021/0284852 A1    Sep. 16, 2021

(30) Foreign Application Priority Data

Sep. 30, 2016 (JP) .............................. JP2016-193541

(51) Int. Cl.
| C09D 11/101 | (2014.01) |
| B41M 1/06 | (2006.01) |
| C09D 11/037 | (2014.01) |
| C09D 11/107 | (2014.01) |

(52) U.S. Cl.
CPC ............. *C09D 11/101* (2013.01); *B41M 1/06* (2013.01); *C09D 11/037* (2013.01); *C09D 11/107* (2013.01)

(58) Field of Classification Search
None
See application file for complete search history.

(56) References Cited

U.S. PATENT DOCUMENTS

| 2004/0201659 A1* | 10/2004 | Watanabe ............ B41M 7/0081 347/100 |
| 2006/0048662 A1 | 3/2006 | Hjelmroth et al. |
| 2007/0165091 A1 | 7/2007 | Oishi |
| 2010/0304098 A1* | 12/2010 | Ohno ..................... C09D 11/40 428/195.1 |
| 2015/0159019 A1 | 6/2015 | Kitao et al. |
| 2015/0252205 A1 | 9/2015 | Sarkisian et al. |

FOREIGN PATENT DOCUMENTS

| CN | 1714127 A | 12/2005 | |
| CN | 101003204 A | 7/2007 | |
| CN | 104583337 A | 4/2015 | |
| CN | 104662108 A | 5/2015 | |
| JP | 2004-51881 A | 2/2004 | |
| JP | 2008-143993 A | 6/2008 | |
| JP | 2016-11412 A | 1/2016 | |
| WO | WO 2004/037934 A1 | 5/2004 | |
| WO | WO-2007125855 A1 * | 11/2007 | ............. B41M 1/06 |
| WO | WO 2009/008226 A1 | 1/2009 | |
| WO | WO 2014/030767 A1 | 2/2014 | |
| WO | WO 2014/051547 A1 | 4/2014 | |

OTHER PUBLICATIONS

International Search Report, issued in PCT/JP2017/034564, PCT/ISA/210, dated Nov. 28, 2017.
Written Opinion of the International Searching Authority, issued in PCT/JP2017/034564, PCT/ISA/237, dated Nov. 28, 2017.

* cited by examiner

*Primary Examiner* — Joshua D Zimmerman
(74) *Attorney, Agent, or Firm* — Birch, Stewart, Kolasch & Birch, LLP

(57) ABSTRACT

To provide is a manufacturing method for obtaining printed material in which, in lithographic printing, a printed part where multiple colors are superimposed on each other has a high gloss, and also a lithographic printing ink set. The method for manufacturing printed material according to the present invention includes a step of coating at least black ink for lithographic printing, cyan ink for lithographic printing, magenta ink for lithographic printing, and yellow ink for lithographic printing on a substrate, in which a difference in surface tension between the inks to be coated on a substrate is at most equal to 3.5 mN/m. The lithographic printing ink set according to the present invention is a lithographic printing ink set including at least black ink, cyan ink, magenta ink, and yellow ink, in which a difference in surface tension between the inks included in the lithographic printing ink set is at most equal to 3.5 mN/m.

19 Claims, No Drawings

METHOD FOR MANUFACTURING PRINTED MATERIAL USING LITHOGRAPHIC PRINTING INK, AND LITHOGRAPHIC PRINTING INK SET

TECHNICAL FIELD

The present invention relates to a method for manufacturing printed material using lithographic printing ink, and a lithographic printing ink set.

BACKGROUND ART

Lithographic printing is a printing system that is widely used as a system for supplying a large volume of printed material at high speed and low cost. In addition, to cope with environmental problems, recently there is a demand for reducing volatile components included in lithographic printing ink. Due to this reason, use of lithographic printing ink which contains no volatile component and is cured instantly upon active energy ray irradiation is under progress (hereinbelow, referred to as "active energy ray-curable lithographic printing ink"). Since shortening of a drying step can be achieved in addition to the environmental advantage, the active energy ray-curable lithographic printing ink can further enhance the productivity of lithographic printing.

According to the lithographic printing, an image is formed by patterning a material which repels ink into a non-printing part. There are offset printing in which wetting water is used as a material which repels ink and waterless offset printing in which silicone rubber is used. However, in any of those lithographic printing methods, if the aggregation force of ink is insufficient under high shear conditions during printing, the ink is adhered, without repelling, onto the non-printing part in which the ink adhesion is not supposed to occur originally. The adhered ink is transferred to an undesired area of a substrate. This phenomenon is referred to as scumming, and it is one kind of printing defects.

To enhance the aggregation force of ink, lithographic printing ink for suppressing scum by increasing the resin concentration in ink is suggested (for example, Patent Literature 1).

However, in terms of suitability for printing, various kinds of problems occur when the resin concentration is increased. For example, as the adhesion property onto a printing plate is poor, an image cannot be correctly printed on printed material. Furthermore, as the fluidity of ink is low, it is easy to have an occurrence of irregularities on the surface of ink which has been transferred onto a substrate, and thus gloss of the printed material tends to decrease. In particular, for a printed part in which multiple colors are superimposed on each other, gloss decreases further as the printed part is affected by the irregularities of lower layer ink.

As an ink formulation for enhancing the gloss of a printed part in which multiple colors are superimposed on each other, active energy ray-curable ink in which the uppermost layer ink of a printed part contains, as a gloss enhancer, one or more kinds selected from phthalic acid ester, adipic acid ester, and sebacic acid ester is suggested (for example, Patent Literature 2).

However, low molecular-weight compounds such as phthalic acid ester, adipic acid ester, and sebacic acid ester evaporate little by little under high shear conditions during printing. As a result, the transferability deteriorates as caused by thickening of ink, or printing defects such as a change in quality of printed material between early stage and late stage of the printing are yielded.

CITATION LIST

Patent Literature

Patent Literature 1: JP 2008-143993 A (Claims)
Patent Literature 2: JP 2016-11412 A (Claims)

SUMMARY OF INVENTION

Technical Problem

Accordingly, the problem to be solved by the present invention is to provide a manufacturing method for obtaining printed material in which, in lithographic printing, a printed part where multiple colors are superimposed on each other has a high gloss, and a lithographic printing ink set. Also provided are a manufacturing method for suitably obtaining printed material in which the single color part has high gloss while scumming resistance is ensured, and a lithographic printing ink set.

Solution to Problem

The method for manufacturing printed material according to the present invention includes a step of coating at least black ink for lithographic printing, cyan ink for lithographic printing, magenta ink for lithographic printing, and yellow ink for lithographic printing on a substrate, in which a difference in surface tension between the inks to be coated on a substrate is at most equal to 3.5 mN/m.

Furthermore, the lithographic printing ink set according to the present invention is a lithographic printing ink set including at least black ink, cyan ink, magenta ink, and yellow ink, in which a difference in surface tension between the inks included in the lithographic printing ink set is at most equal to 3.5 mN/m.

Advantageous Effects of Invention

According to the method for manufacturing printed material and lithographic printing ink set of the present invention, printed material in which, in lithographic printing, a printed part where multiple colors are superimposed on each other has a high gloss, can be obtained. Furthermore, printed material with highly glossy single color part with no scum can be suitably obtained.

DESCRIPTION OF EMBODIMENTS

Hereinbelow, the method for manufacturing printed material and lithographic printing ink set of the present invention are specifically described.

<Method for Manufacturing Printed Material>

In general, color hue of printed material is expressed by using black ink, cyan ink, magenta ink, and yellow ink. The method for manufacturing printed material according to the present invention is characterized in that it includes a step of coating at least black ink for lithographic printing, cyan ink for lithographic printing, magenta ink for lithographic printing, and yellow ink for lithographic printing on a substrate.

Surface tension of the lithographic printing ink of the present invention is calculated from contact angle which is measured by liquid drop method using an automatic contact angle meter. First, ink is evenly coated on top of a glass substrate. If the ink surface is not even, smaller angle than actual contact angle is measured to become a cause of error. To have even smoother surface, after coating the ink on a glass substrate, the resultant is allowed to stand for 30 minutes in dark place, and then measurement of contact angle is carried out. As a solution for adding drops on top of ink, pure water and ethylene glycol, of which surface tension value is well known, are used. By using a syringe, liquid drops of the above solution are prepared, and they are added by contacting the liquid drops with a surface of the ink coated on a glass substrate. By using contact angle 30 seconds after adding the drops, surface tension of ink is calculated. In general, materials having closer surface tension have better wettability between them.

Descriptions are given for the method for calculating surface tension of ink by using contact angle. In general, surface tension is dissociated into non-polar dispersive part $\gamma^d$ and polar hydrogen-bonding dispersive part $\gamma^h$ (see, the mathematical formula (1) shown below). When solution B is added as a drop on top of material A, Young's equation is established between material A and solution B (surface tension of material A is described as $\gamma_A$, surface tension of solution B is described as $\gamma_B$, surface tension between material A and solution B is described as $\gamma_{A-B}$, and contact angle between material A and solution B is described as $\theta_{A-B}$) (see the mathematical formula (2) shown below). Furthermore, extended Fowkes's equation is claimed for the surface tension between material A and solution B (see the mathematical formula (3) shown below). When ink is used as material A and pure water and ethylene glycol are used as solution B, the following mathematical formula (4) and mathematical formula (5) are obtained from the mathematical formula (1), the mathematical formula (2), and the mathematical formula (3).

[Mathematical Formula 1]

$$\gamma = \gamma^d + \gamma^h \quad (1)$$

[Mathematical Formula 2]

$$\gamma_A = \gamma_{A-B} + \gamma_B \cos\theta_{A-B} \quad (2)$$

[Mathematical Formula 3]

$$\gamma_{A-B} = \gamma_A + \gamma_B - 2\sqrt{\gamma_A^d \gamma_B^d} - 2\sqrt{\gamma_A^h \gamma_B^h} \quad (3)$$

[Mathematical Formula 4]

$$\sqrt{\gamma_{ink}^d} = \frac{\gamma_{ethylene\ glycol}(1 + \cos\theta_{ink-ethylene\ glycol}) - 2\sqrt{\gamma_{ethylene\ glycol}^h \gamma_{ink}^h}}{2\sqrt{\gamma_{ethylene\ glycol}^d}} \quad (4)$$

$$\sqrt{\gamma_{ink}^h} = \frac{\gamma_{pure\ water}\sqrt{\gamma_{ethylene\ glycol}^d}(1 + \cos\theta_{ink-pure\ water}) - \gamma_{ethylene\ glycol}\sqrt{\gamma_{pure\ water}^d}(1 + \cos\theta_{ink-ethylene\ glycol})}{2\left(\sqrt{\gamma_{ethylene\ glycol}^d \gamma_{pure\ water}^h} - \sqrt{\gamma_{pure\ water}^d \gamma_{ethylene\ glycol}^h}\right)} \quad (5)$$

(in the above mathematical formula (4) and the mathematical formula (5), value of the dispersive part is 0 or more for each of $\gamma^d$ and $\gamma^h$).

From the mathematical formula (1), the mathematical formula (4), and the mathematical formula (5), the surface tension of ink is calculated based on the measurement values of contact angle between ink and ethylene glycol, $\theta_{ink-ethyleneglycol}$, and contact angle between ink and pure water, $\theta_{ink-pure\ water}$. For pure water, surface tension $\gamma$ is 72.8 mN/m, non-polar dispersive part $\gamma^d$ is 21.8 mN/m, and polar hydrogen-bonding dispersive part $\gamma^h$ is 51.0 mN/m, while, for ethylene glycol, surface tension $\gamma$ is 48.8 mN/m, non-polar dispersive part $\gamma^d$ is 32.8 mN/m, and polar hydrogen-bonding dispersive part is 16.0 mN/m.

In lithographic printing, ink supplied in ink bottle is transferred in order of metal roll, planar plate, and blanket, and, according to final transfer from blanket to substrate, printed material is obtained. Due to that reason, the material of blanket exerts huge influence on the quality of printed material. In general, the material of blanket is ethylene-propylene-diene rubber or acrylonitrile-butadiene rubber. For active energy ray-curable ink, ethylene-propylene-diene rubber hardly allowing penetration of monomers in ink is widely used. When the aforementioned method for measuring contact angle and method for calculating surface tension of a material are used, surface tension of ethylene-propylene-diene rubber is calculated as 25.4 mN/m and surface tension of acrylonitrile-butadiene rubber is calculated as 38.0 mN/m. As the ink and blanket have closer surface tension between them, better wettability of ink for blanket is obtained and the transferability to blanket is improved more. On the contrary, it is considered that, as it becomes more difficult for the ink to be released from blanket, it consequently becomes easier to have an occurrence of irregularities on a surface of the ink transferred to a substrate, and thus gloss of printed material deteriorates. It is considered that higher surface tension of the ink than surface tension of blanket causes poorer transferability of the ink to blanket, and thus it consequently becomes easier to have an occurrence of irregularities on a surface of the ink transferred to a substrate and gloss of printed material deteriorates.

The method for manufacturing printed material of the present invention is characterized in that a difference in surface tension between inks to be coated on a substrate is at most equal to 3.5 mN/m. It means that, for surface tension of each of plural lithographic printing inks that are coated on a substrate, the difference between the maximum surface tension and the minimum surface tension is at most equal to 3.5 mN/m. As the difference in surface tension is at most equal to 3.5 mN/m, wettability of upper layer ink for lower layer ink is improved in a printed part in which multiple colors are superimposed on each other and it becomes easier to have a smooth upper layer, and thus gloss of printed material is improved. The difference in surface tension between inks is more preferably at most equal to 3.0 mN/m, and even more preferably at most equal to 2.5 mN/m. Surface tension of each ink can be controlled based on type and/or content of at least one selected from a resin, polyfunctional (meth)acrylate, and a surfactant to be contained in the ink. Accordingly, the difference in surface tension between inks to be coated on a substrate can be controlled by modifying the each type of the resin, polyfunctional (meth)acrylate, and/or surfactant to be contained in the ink, or by increasing or decreasing their content.

According to the method for manufacturing printed material of the present invention, surface tension of lithographic printing ink to be coated on a substrate is preferably 45 mN/m or more and 60 mN/m or less. This means that, surface tension of each of the plural lithographic printing inks to be coated on a substrate is 45 mN/m or more and 60 mN/m or less. As the surface tension of lithographic printing ink is 45 mN/m or more, it becomes easier for the ink to be released when it is transferred from a blanket to a substrate, and, as surface of the ink transferred onto a substrate is smooth, printed material can have more improved gloss. More preferably, the surface tension of lithographic printing ink is 48 mN/m or more, and even more preferably 51 mN/m or more. Furthermore, as the surface tension of lithographic printing ink is 60 mN/m or less, transferability of the ink onto a blanket is improved. The surface tension of lithographic printing ink is more preferably 58 mN/m or less, and even more preferably 56 mN/m or less.

In lithographic printing, printed material is obtained by transferring, in turn, inks on a substrate, and according to the order of transferring inks, a variation in gloss of printed material is caused.

According to the method for manufacturing printed material of the present invention, it is preferable that inks are transferred onto a substrate, in order of black ink for lithographic printing, cyan ink for lithographic printing, magenta ink for lithographic printing, and yellow ink for lithographic printing.

Tack value of the lithographic printing ink of the present invention is obtained by measuring 1.31 ml of ink, which has been taken using an ink pipette, using an inkometer at 38° C. with rotation number of 400 rpm. The measurement value obtained 1 minute after starting the measurement is taken as the tack value of the present invention. The tack value is an index representing the adhesiveness of ink, and higher tack value indicates higher adhesiveness of ink.

According to the method for manufacturing printed material of the present invention, tack value (1 minute value) of the black ink for lithographic printing to be coated on a substrate is preferably 5.0 or more and 8.0 or less. The phenomenon showing release of lower layer ink, which has been transferred previously on a substrate, by later-printed ink is referred to as back trapping. Once the back trapping occurs, printed material with target image is not obtained and unclear printed material is formed instead. Furthermore, as the color of previously-printed ink is mixedly present in the later-printed ink, printing defects such as change in color hue of the printed material between start point and end point of printing occur. As a method for reducing tack value, lowering the resin concentration in ink or adding silicone liquid, or the like are generally known. However, when the resin concentration in ink is lowered, aggregation force of the ink is lowered so that scumming resistance of the ink is impaired, and, when silicone liquid is added, a film of silicone liquid is formed on ink surface so as to impair the roller-to-roller transferability of the ink, thus yielding printing defects. In order to prevent those printing defects, tack value of the black ink for lithographic printing is more preferably 5.5 or more, and even more preferably 6.0 or more. Furthermore, if tack value of the ink is high, it is easy to have an occurrence of irregularities on a surface of ink transferred onto a substrate, thus yielding lower gloss of printed material. In a printed part in which colors are superimposed on each other, in particular, once irregularities are formed on a surface of black ink for lithographic printing, which is a lower layer ink, the gloss further decreases as it is affected from the irregularities. In order to increase the gloss of a printed part in which colors are superimposed on each other, tack value of the black ink for lithographic printing is more preferably 7.5 or less, and even more preferably 7.0 or less.

Furthermore, tack value (1 minute value) of the cyan ink for lithographic printing, the magenta ink for lithographic printing, and the yellow ink for lithographic printing to be coated on a substrate is, similar to the black ink for lithographic printing, preferably 5.0 or more and 8.0 or less, and more preferred range is also the same as above. In order to prevent the back trapping, it is preferable to lower the adhesiveness of the ink in accordance with printing order. When printing is carried out in the order of black ink, cyan ink, magenta ink, and yellow ink, tack value of each ink is preferably adjusted in ascending order of black ink, cyan ink, magenta ink, and yellow ink.

According to the method for manufacturing printed material of the present invention, in a case in which the lithographic printing ink to be used has an active energy ray curing property, ink coating film on printed material can be cured instantly by irradiating active energy ray. The method for manufacturing printed material of the present invention includes a step of irradiating an ink coating film transferred onto a substrate with active energy ray for curing. As for the active energy ray, any active energy ray can be used as long as it has excitation energy required for the curing reaction, and, for example, ultraviolet ray or electron beam are preferably used. In case of having the curing by electron beam, an electron beam apparatus having energy ray of 100 eV or more and 500 eV or less is preferably used. In case of having the curing by ultraviolet ray, an apparatus for ultraviolet ray irradiation such as high pressure mercury lamp, xenon lamp, metal halide lamp, or LED lamp is preferably used. When a metal halide lamp is used, if conveying speed by conveyer is set at 50 m/min or more and 150 m/min or less with a lamp having illuminance of 80 W/cm or more and 150 W/cm or less, the curing of ink is easily achieved, and thus it is also preferable from the viewpoint of productivity. With regard to the illuminance of a lamp, it is more preferably 90 W/cm or more, and even more preferably 100 W/cm or more because easier curing of ink can be obtained. Furthermore, in order to reduce the power consumption, the illuminance of a lamp is more preferably 140 W/cm or less, and even more preferably 130 W/cm or less. With regard to the conveying speed of a conveyer, it is more preferably 60 m/min or more, and even more preferably 70 m/min or more to enhance the productivity. Furthermore, because the ink is easily cured, in order to extend the time from transfer to curing of the ink and enhance the gloss of printed material by further smoothening, the conveying speed of a conveyer is more preferably 130 m/min or less, and even more preferably 110 m/min or less.

With regard to a method for manufacturing printed material by utilizing curing by active energy ray, conventionally, ink is cured by irradiating active energy ray not long after the transfer of ink on a substrate. As such, there is a problem that the ink is not sufficiently smoothened so that irregularities occur on a surface of ink coating film, thus yielding a decrease in gloss of printed material.

According to the method for manufacturing printed material of the present invention, by adjusting the viscosity of lithographic printing ink as described in the followings, more excellent quality of printed material can be achieved. Viscosity of lithographic printing ink is obtained by measuring 0.15 ml of ink, which has been taken with an ink pipette, using a cone-plate rotation type viscometer at 25° C.

According to the method for manufacturing printed material of the present invention, viscosity (A) at rotation number of 0.5 rpm of lithographic printing ink to be coated on a substrate is preferably 5 Pa·s or more and 200 Pa·s or less. As the viscosity (A) is 5 Pa·s or more, roller-to-roller transferability of the ink is enhanced. More preferably, the viscosity (A) is 10 Pa·s or more, and even more preferably 20 Pa·s or more. Furthermore, as the viscosity (A) is 200 Pa·s or less, fluidity of ink becomes favorable and it is easier for the ink transferred onto a substrate to have smoothness, and thus gloss of printed material is enhanced. More preferably, the viscosity (A) is 150 Pa·s or less, and even more preferably 100 Pa·s or less.

According to the method for manufacturing printed material of the present invention, both of viscosity (B) at rotation number of 20 rpm (corresponding to shear speed of 120 s$^{-1}$) and viscosity (C) at rotation number of 50 rpm of lithographic printing ink to be coated on a substrate are preferably 5 Pa·s or more and 200 Pa·s or less. As both of the viscosity (B) and viscosity (C) are 5 Pa·s or more, higher aggregation force of the ink is obtained so that the scumming resistance of the ink can be enhanced. They are more preferably 10 Pa·s or more, and even more preferably 15 Pa·s or more. Furthermore, as the viscosity (B) and viscosity (C) are 200 Pa·s or less, a favorable adhesion property of the ink onto a lithographic printing plate is obtained. They are more preferably 40 Pa·s or less, and even more preferably 20 Pa·s or less.

According to the method for manufacturing printed material of the present invention, the viscosity ratio (C)/(B), which is the ratio between the viscosity (B) and the viscosity (C) of lithographic printing ink to be coated on a substrate, is preferably 0.75 or more and 1.00 or less. As the viscosity ratio (C)/(B) is within the above range, aggregation force of the ink is sufficiently maintained even under high speed and high shear conditions during printing, and thus the scumming resistance of the ink can be enhanced. More preferably, the ratio is 0.80 or more and 1.00 or less, and even more preferably 0.90 or more and 1.00 or less.

In the present invention, to control the aforementioned viscosity ratio (C)/(B), the lithographic printing ink to be coated on a substrate preferably contains a resin having a hydrophilic group and polyfunctional (meth)acrylate having a hydroxyl group. It is considered that, because the hydrophilic group and hydroxyl group allow a favorable pigment dispersibility in the ink, they reduce the structural viscosity of the ink (high viscosity resulting from aggregated structure made by pigment) so as to yield lower viscosity of ink at low shear conditions. It is considered that, as the ink viscosity is low under low shear conditions, printed material in which lithographic printing ink is used can exhibit high gloss. Furthermore, the resin having a hydrophilic group is dissolved in the polyfunctional (meth)acrylate having a hydroxyl group, and high viscosity is yielded based on an interaction such as hydrogen bond between the hydrophilic group and hydroxyl group, or the like. The dissolved product is Newtonian fluid, and can maintain constant viscosity without depending on shearing strength. In the method for manufacturing printed material of the present invention, in a high shear region (rotation number of 20 rpm or more) after the structural viscosity has degraded, viscosity of the above dissolved product as a medium becomes dominant so that the viscosity decrease caused by shearing is small, and thus high viscosity is maintained under high shear conditions. As a result, since the ink can have high aggregation force and ink repellency against non-printing part is improved under high shear conditions such as printing, scumming resistance is enhanced.

According to the method for manufacturing printed material of the present invention, the lithographic printing ink to be coated on a substrate may contain a resin having a hydrophilic group, polyfunctional (meth)acrylate, a pigment, and a surfactant.

It is considered that ink fluidity can be enhanced as the pigment in ink is dispersion-stabilized by hydrophilic group in the resin having a hydrophilic group. As the ink fluidity is enhanced, the ink transferred onto a substrate can be more easily smoothened, and thus gloss of printed material is enhanced. Furthermore, based on an interaction such as hydrogen bond, the hydrophilic group increases the aggregation force of ink under high shear conditions during printing. Since the ink repellency against non-printing part is improved as the ink has higher aggregation force, scumming resistance is enhanced consequently. According to the method for manufacturing printed material of the present invention, as the lithographic printing ink to be coated on a substrate contains a resin having a hydrophilic group, the ink becomes soluble in aqueous cleaning solution in which water is contained as a main component, and thus application of a non-petroleum cleaning agent can be made. Furthermore, by adjusting the type and/or content of a resin having a hydrophilic group, surface tension of the lithographic printing ink can be either increased or decreased, thus contributing to adjusting a difference in surface tension of the lithographic printing ink to be coated on a substrate to a value of at most equal to 3.5 mN/m.

Examples of the hydrophilic group of the resin having a hydrophilic group include a hydroxyl group, an amino group, a mercapto group, a carboyl group, a sulfo group, and a phosphoric acid group. Among them, a carboxyl group having favorable property of dispersing a pigment is particularly preferable.

Acid value of the resin having a hydrophilic group is preferably 30 mgKOH/g or more from the viewpoint of obtaining favorable solubility in an aqueous cleaning solution, pigment dispersibility, scumming resistance of the resin. The acid value is more preferably 60 mgKOH/g or more, and even more preferably 75 mgKOH/g or more. Furthermore, as the acid value is 200 mgKOH/g or less, an interaction such as hydrogen bond is suppressed and fluidity of the lithographic printing ink of the present invention is maintained so that the tack (adhesiveness) can be lowered, and thus preferable. The acid value is more preferably 170 mgKOH/g or less, and even more preferably 150 mgKOH/g or less.

The acid value can be obtained by Neutralization titration method of Section 3.1 of Test methods of JIS K 0070: 1992.

Solubility of the resin having a hydrophilic group in water is preferably 0.1 g/(100 g-H$_2$O) or more. As the solubility is within this range, cleaning using an aqueous cleaning solution can be easily carried out. Solubility of the resin having a hydrophilic group in water is more preferably 0.3 g/(100 g-H$_2$O) or more, and even more preferably 0.5 g/(100 g-H$_2$O) or more. Although more favorable water cleaning property can be obtained as the solubility in water increases, because the water resistance of ink cured film is impaired if the solubility is excessively high, the solubility of the resin having a hydrophilic group in water is preferably 100 g/(100 g-H$_2$O) or less, more preferably 50 g/(100 g-H$_2$O) or less, and even more preferably 10 g/(100 g-H$_2$O) or less. Furthermore, the solubility indicates the mass (g) of the resin dissolved in 100 g of water at 25° C.

When the weight average molecular weight of the resin having a hydrophilic group is 5,000 or more, the scumming resistance of the lithographic printing ink is enhanced, and thus preferable. It is more preferably 15,000 or more, and even more preferably 20,000 or more. Furthermore, when the weight average molecular weight is 100,000 or less, fluidity of the lithographic printing ink is maintained so as to reduce the tack (adhesiveness), and thus preferable. The weight average molecular weight is more preferably 75,000 or less, and even more preferably 50,000 or less. Furthermore, the weight average molecular weight can be obtained by using gel permeation chromatography (GPC) and carrying out measurement with use of polystyrene as a reference.

Examples of the resin having a hydrophilic group include acrylic resin, styrene acrylic resin, styrene maleic acid resin, rosin-modified maleic acid resin, rosin-modified acrylic resin, epoxy resin, polyester resin, polyurethane resin, and phenol resin, but it is not particularly limited. Of the resins as described above, acrylic resin, styrene acrylic resin, and styrene maleic acid resin are preferably used as the resin having a hydrophilic group in view of availability of the monomer, low cost, easy synthesis, compatibility with other components of the ink, pigment dispersibility, and the like.

Of the resins as described above, acrylic resin, styrene acrylic acid resin, and styrene maleic acid resin can be obtained by the following method. Namely, they are obtained by polymerizing or copolymerizing, by using a radical polymerization initiator, a compound selected from a carboxyl group-containing monomer such as acrylic acid, methacrylic acid, itaconic acid, crotonic acid, maleic acid, fumaric acid, vinyl acetate, or an acid anhydride thereof, a hydroxyl group-containing monomer such as 2-hydroxyethyl acrylate, an amino group-containing monomer such as dimethylamino ethyl methacrylate, a mercapto group-containing monomer such as 2-(mercaptoacetoxy)ethyl acrylic acid, a sulfo group-containing monomer such as acryl amide t-butyl sulfonic acid, a phosphate group-containing monomer such as 2-methacryloyloxy ethyl acid phosphate, methacrylate, acrylate, styrene, acrylonitrile, vinyl acetate, and the like.

Specific examples of the resin having a hydrophilic group include (meth)acrylic acid copolymer, (meth)acrylic acid-(meth)acrylate copolymer, styrene-(meth)acrylic acid copolymer, styrene-(meth)acrylic acid-(meth)acrylate copolymer, styrene-maleic acid copolymer, styrene-maleic acid-(meth)acrylic acid copolymer, and styrene-maleic acid-(meth)acrylate copolymer.

From the viewpoint having easy curing by active energy ray, it is preferable that the resin having a hydrophilic group has an ethylenic unsaturated group. Iodine value of the ethylenic unsaturated group in the resin having a hydrophilic group and an ethylenic unsaturated group is preferably 0.5 mol/kg or more and 3.0 mol/kg or less. As the iodine value is within the above range, the ink can be easily cured by active energy ray, and the acid value of the resin having a hydrophilic group and an ethylenic unsaturated group can be easily adjusted to a suitable range. The iodine value of the ethylenic unsaturated group is more preferably 1.0 mol/kg or more, and even more preferably 1.5 mol/kg or more to promote the ink curing. Furthermore, to easily adjust the acid value of the resin having a hydrophilic group and an ethylenic unsaturated group to a suitable range, the iodine value is more preferably 2.7 mol/kg or less, and even more preferably 2.4 mol/kg or less. The iodine value of the ethylenic unsaturated group can be determined according to the method described in Section 6.0 of Test Methods of JIS K 0070: 1992.

The resin having a hydrophilic group and an ethylenic unsaturated group can be manufactured by a following method. Namely, according to an addition reaction of an ethylenic unsaturated compound containing glycidyl group or isocyanate group, acrylic acid chloride, methacrylic acid chloride, or allyl chloride to the active hydrogen-containing group in the resin having a hydrophilic group i.e., mercapto group, amino group, hydroxyl group, or carboxyl group, the resin having a hydrophilic group and an ethylenic unsaturated group is obtained. However, the method is not limited to the method as described above.

Furthermore, specific examples of the ethylenic unsaturated compound having a glycidyl group include glycidyl acrylate, glycidylmethacrylate, allyl glycidyl ether, glycidyl crotonate, and glycidyl isocrotonate.

Furthermore, specific examples of the ethylenic unsaturated compound having an isocyanate group include acryloyl isocyanate, methacryloyl isocyanate, acryloyl ethyl isocyanate, and methacryloyl ethyl isocyanate.

In the method for manufacturing printed material of the present invention, when content of the resin having a hydrophilic group is 5% by mass or more in the lithographic printing ink to be coated on a substrate, pigment dispersibility in ink and scumming resistance of the ink are improved, and thus preferable. The content is more preferably 8% by mass or more, and even more preferably 11.5% by mass or more. Furthermore, when content of the resin having a hydrophilic group is 30% by mass or less, fluidity of the ink is maintained so as to reduce the tack (adhesiveness), and thus preferable. The content is more preferably 20% by mass or less, and even more preferably 14% by mass or less.

In the method for manufacturing printed material of the present invention, it is preferable for the lithographic printing ink to be coated on a substrate to contain polyfunctional (meth)acrylate. Because polyfunctional (meth)acrylate has a double bond group, the ink can be easily cured by active energy ray. Furthermore, by adjusting the type and/or content of polyfunctional (meth)acrylate, surface tension of the lithographic printing ink can be either increased or decreased, thus contributing to adjusting the difference in surface tension of the lithographic printing ink to be coated on a substrate to 3.5 mN/m or less.

The polyfunctional (meth)acrylate is not particularly limited as long as it is a compound having two or more (meth)acrylate groups. Number of the (meth)acrylate group (hereinbelow, it may be also referred to as "number of the functional group") is preferably 2 or more, more preferably 3 or more, and even more preferably 4 or more. Furthermore, number of the functional group in polyfunctional (meth)acrylate is preferably 8 or less, more preferably 7 or less, and even more preferably 6 or less.

It is preferable that the polyfunctional (meth)acrylate has a polar group. Examples of the polar group include a hydroxyl group and a carboxy group, and, of those, it is preferable to have a hydroxyl group. It is considered that the polar group such as hydroxyl group can disperse and stabilize the pigment, and thus fluidity of the ink is enhanced. As the fluidity of the ink is enhanced, the ink transferred to a substrate can be easily smoothened, thus yielding enhanced gross of printed material. Furthermore, based on an interaction such as hydrogen bond, the polar group such as hydroxyl group increases the aggregation force of ink under high shear conditions during printing. Since the ink repellency against non-printing part is improved as the ink has higher aggregation force, scumming resistance is enhanced consequently.

Hydroxyl value of the polyfunctional (meth)acrylate is preferably 50 mgKOH/g or more from the viewpoint of having enhanced pigment dispersibility and also scumming resistance of the ink. The hydroxyl value is more preferably 75 mgKOH/g or more, and even more preferably 100 mgKOH/g or more. Furthermore, as the hydroxyl value is 200 mgKOH/g or less, an interaction such as hydrogen bond is suppressed and favorable fluidity of the ink is maintained so that the tack (adhesiveness) can be lowered, and thus preferable. The hydroxyl value is more preferably 180 mgKOH/g or less, and even more preferably 160 mgKOH/g or less.

The hydroxyl value of the polyfunctional (meth)acrylate can be obtained by the method described in Section 7.1 of Test methods of JIS K 0070: 1992.

Molecular weight of the polyfunctional (meth)acrylate is preferably 100 or more since the scumming resistance of the ink can be enhanced. The molecular weight is more preferably 200 or more, and even more preferably 250 or more. Furthermore, as the molecular weight is 1,000 or less, favorable fluidity of the ink can be maintained and the tack (adhesiveness) can be lowered, and thus preferable. The molecular weight is more preferably 700 or less, and even more preferably 500 or less.

Specific examples of the polyfunctional (meth)acrylate include, as bifunctional (meth)acrylate, ethylene glycol di(meth)acrylate, diethylene glycol di(meth)acrylate, triethylene glycol di(meth)acrylate, polyethylene glycol di(meth)acrylate, tripropylene glycol di(meth)acrylate, 1,3 butylene glycol di(meth)acrylate, 1,6 hexane diol di(meth)acrylate, 1,9 nonane diol di(meth)acrylate, and neopentyl glycol di(meth)acrylate, as trifunctional (meth)acrylate, trimethylolpropane tri(meth)acrylate, glycerin tri(meth)acrylate, isocyanuric acid tri(meth)acrylate, and ethylene oxide adduct or propylene oxide adduct thereof, as tetrafunctional (meth)acrylate, pentaerythritol tetra(meth)acrylate, ditrimethylolpropane tetra(meth)acrylate, diglycerin tetra(meth)acrylate, and ethylene oxide adduct or propylene oxide adduct thereof, and as penta- or higher functional (meth)acrylate, dipentaerythritol hexa(meth)acrylate, and ethylene oxide adduct or propylene oxide adduct thereof. Furthermore, specific examples of preferred polyfunctional (meth)acrylate having a hydroxyl group include poly (meth)acrylate of polyhydric alcohol such as trimethylolpropane, glycerin, pentaerythritol, diglycerin, ditrimethylolpropane, isocyanuric acid, or dipentaerythritol, and an alkylene oxide adduct thereof. More specific examples thereof include di(meth)acrylate of trimethylolpropane, di(meth)acrylate of glycerin, di- or tri((meth)acrylate of pentaerythritol, di- or tri(meth)acrylate of diglycerin, di- or tri(meth)acrylate of ditrimethylolpropane, di-, tri-, tetra-, or penta(meth)acrylate of dipentaerythritol, and ethylene oxide adduct, propylene oxide adduct, or tetraethylene oxide adduct thereof. Among those described above, from the viewpoint that the lithographic printing ink of the present invention has excellent fluidity and pigment dispersibility and also enhanced scumming resistance, pentaerythritol tri(meth)acrylate, diglycerin tri(meth)acrylate, and ditrimethylolpropane tri(meth)acrylate are particularly preferable.

In the method for manufacturing printed material of the present invention, when the lithographic printing ink to be coated on a substrate contains the polyfunctional (meth)acrylate at 20% by mass or more, pigment dispersibility and scumming resistance of the ink are enhanced, and thus preferable. It is more preferably 30% by mass or more, and even more preferably 40% by mass or more. Furthermore, it is preferably 75% by mass or less because the favorable fluidity of the ink can be maintained. It is more preferably 70% by mass or less, and even more preferably 65% by mass or less.

With regard to the surface tension of the ink, basically, higher surface tension is yielded as the amount of a polar group increases in the ink while lower surface tension is yielded as the amount of a polar group decreases in the ink. By adjusting the content of the resin having a hydrophilic group and the polyfunctional (meth)acrylate having a hydroxyl group, the amount of the polar group in the ink is modified so that the difference in surface tension between the inks to be coated on a substrate can be easily adjusted to 3.5 mN/m or less. The difference in surface tension of the inks to be coated on a substrate can be controlled based on type and/or content of the resin having a hydrophilic group and polyfunctional (meth)acrylate. In addition to them, or independently, the difference in surface tension of the inks to be coated on a substrate can be controlled based on type and/or content of the surfactant, pigment, or diluents.

To easily adjust the surface tension of the ink to 45 mN/m or more and 60 mN/m or less while ensuring the fluidity and scumming resistance of the ink, it is preferable that the acid value of the resin having a hydrophilic group is 60 mgKOH/g or more and 200 mgKOH/g or less, content of the resin having a hydrophilic group is 11.5% by mass or more and 14% by mass or less, hydroxyl value of the polyfunctional (meth)acrylate having a hydroxyl group is 50 mgKOH/g or more and 200 mgKOH/g or less, and content of the polyfunctional (meth)acrylate having a hydroxyl group is 20% by mass or more and 30% by mass or less.

With regard to the black ink for lithographic printing, to easily adjust the tack value to 5.0 or more and 8.0 or less while ensuring the scumming resistance, it is preferable that the acid value of the resin having a hydrophilic group is 60 mgKOH/g or more and 200 mgKOH/g or less, weight average molecular weight of the resin having a hydrophilic group is 15,000 or more and 50,000 or less, content of the resin having a hydrophilic group is 11.5% by mass or more and 14% by mass or less, hydroxyl value of the polyfunctional (meth)acrylate having a hydroxyl group is 50 mgKOH/g or more and 200 mgKOH/g or less, and content of the polyfunctional (meth)acrylate having a hydroxyl group is 20% by mass or more and 30% by mass or less.

In the method for manufacturing printed material of the present invention, it is preferable that the lithographic printing ink to be coated on a substrate contains a surfactant. From the viewpoint of adjusting the difference between surface tension of the lithographic printing ink and surface tension of the lithographic printing ink to be coated on a substrate in addition to having enhanced fluidity of the lithographic printing ink, content of the surfactant is 5% by mass or more and 50% by mass or less relative to the pigment.

Specific examples of the surfactant include "Anti-Terra-U (polyaminoamide phosphate)", "Anti-Terra-203/204 (high molecular weight polycarboxylic acid salt)", "Disperbyk-101 (acid ester with polyaminoamide phosphate), 102, 103, 106, 107 (carboxylic acid ester containing hydroxyl group), 110, 111 (copolymerization product containing acid group), 115, 118, 130 (polyamide), 140, 142, 145, 161, 162, 163, 164, 165, 166, 167, 168, 170 (high molecular weight copolymerization product), 171, 174, 180, 181, 182, 184, 185, 187, 190, 191, 192, 193, 199, 2000, 2001, 2008, 2009, 2010, 2012, 2013, 2015, 2022, 2025, 2026, 2050, 2055, 2060, 2061, 2070, 2096, 2150, 2151, 2152, 2155, 2163, 2164, 2200, 2205, 9067, 9076", "Bykumen" (high molecular weight unsaturated acid ester), "BYK-P104, P105 (high molecular weight unsaturated acid polycarboxylic acid)", "P104S, 240S (high molecular weight unsaturated acid polycarboxylic acid and silicone based)", and "Lactimon (long-chain amine and unsaturated polycarboxylic acid and silicone)" manufactured by BYK Chemie.

Furthermore, "Efka 44, 46, 47, 48, 49, 54, 63, 64, 65, 66, 71, 701, 764, 766", "Efkapolymer 100 (modified polyacrylate), 150 (aliphatic modified polymer), 400, 401, 402, 403, 450, 451, 452, 453 (modified polyacrylate), and 745 (copper phthalocyanin-based)" manufactured by Efka CHEMICALS, "Flowlen TG-710 (urethane oligomer), "Flownon SH-290, SP-1000", and "Polyflow No. 50E, No. 300 (acrylic copolymerization product)" manufactured by Kyoei Chemical Co., Ltd., and "Disparlon 325, KS-860, 873SN, 874 (polymer dispersing agent), 1401, #2150 (aliphatic polyhydric carboxylic acid), and #7004 (polyether ester type)" manufactured by Kusumoto Chemicals, Ltd. can be mentioned.

Furthermore, "Demol RN and N (both being naphthalene sulfonic acid formalin condensation product sodium salts), MS, C, and SN-B (all are aromatic sulfonic acid formalin condensation product sodium salts), and EP", "Homogenol L-18 (a polycarboxylic acid type polymer)", "Emulgen 920, 930, 931, 935, 950, and 985 (all are polyoxyethylene nonyl phenyl ethers)", and "Acetamin 24 (coconut amine acetate) and 86 (stearylamine acetate)", all manufactured by Kao Corp., "Solsperse 5000 (phthalocyanine ammonium salt based dispersing agent), 13940 (polyesteramine based dispersing agents), 17000 (fatty acid amine based dispersing agent), 24000 GR, 32000, 33000, 39000, 41000, 53000", all manufactured by Avecia, "Nikkol T106 (polyoxyethylene sorbitan monooleate), MYS-IEX (polyoxyethylene monostearate), and Hexagline 4-0 (hexaglyceryl tetraoleate)", all manufactured by Nikko Chemicals Co., Ltd., and "AJISPER PB821, 822, 824" manufactured by Ajinomoto Fine-Techno Inc., Co. can be mentioned.

In the method for manufacturing printed material of the present invention, the lithographic printing ink to be coated on a substrate may preferably contain a pigment. As for the pigment, one or more kind selected from an inorganic pigment and an organic pigment that are generally used for a lithographic printing ink composition can be used.

Specific examples of the inorganic pigment include titanium dioxide, calcium carbonate, barium sulfate, bengala, cadmium red, chrome yellow, zinc yellow, Prussian blue, ultramarine, organic bentonite, alumina white, iron oxide, carbon black, graphite, and aluminum.

Examples of the organic pigment include phthalocyanine pigments, soluble azo pigments, insoluble azo pigments, lake pigments, quinacridone pigments, isoindoline pigments, threne pigments, and metal complex pigments, and specific examples thereof include phthalocyanine blue, phthalocyanine green, azo red, monoazo red, monoazo yellow, diazo red, diazo yellow, quinacridone red, quinacridone magenta, and isoindoline yellow.

The pigment concentration is preferably 5% by mass or more, more preferably 10% by mass or more, and even more preferably 15% by mass or more to obtain printed paper surface concentration. Furthermore, in order to obtain enhanced fluidity of the ink and favorable roller-to-roller transferability, the pigment concentration is preferably 40% by mass or less, more preferably 30% by mass or less, and even more preferably 25% by mass or less.

In the method for manufacturing printed material of the present invention, the lithographic printing ink to be coated on a substrate preferably contains at least one component selected from silicone fluid, alkyl (meth)acrylate, hydrocarbon solvent, plant oil, fatty acid ester derived from plant oil, and fluorocarbon.

The above component has an effect of reducing deposition of the ink to the silicone rubber which is the non-printing part in the waterless offset printing plate, and, as a result, printed material free of any scum is obtained. Presumably, the deposition of the ink to the silicone rubber is reduced as follows. Namely, as the component contained in the ink diffuses into the ink in accordance with contact with silicone rubber surface, it covers, in the form of a thin film, the silicone rubber surface. It is believed that a thin film formed accordingly prevents the deposition of the ink to the silicone rubber surface so as to prevent staining on the silicone surface.

Of the components as described above, alkyl (meth) acrylate is preferable since it is cured with the irradiation of the active energy ray to improve the physical property of a cured film of the ink and also to enhance simultaneously the sensitivity to active energy ray.

Specific compounds of the above components are as follows.

Examples of the silicone fluid include dimethyl silicone, methylphenylsilicone, alkyl-modified silicone, polyether-modified silicone, aralkyl-modified silicone, fatty acid amide-modified silicone, fatty acid ester-modified silicone, fluoroalkyl-modified silicone, methyl hydrogen silicone, silanol-modified silicone, alcohol-modified silicone, amino-modified silicone, epoxy-modified silicone, epoxy polyether-modified silicone, phenol-modified silicone, carboxy-modified silicone, and mercapto-modified silicone.

Examples of the alkyl (meth)acrylate include nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, and isooctadecyl (meth)acrylate.

Exemplary the hydrocarbon solvent include polyolefin oil, naphthene oil, and paraffin oil.

Examples of the plant oil include soybean oil, linseed oil, safflower oil, tung oil, sesame oil, and dehydrated castor oil.

Examples of the fatty acid ester derived from plant oil include esters of a fatty acid having an alkyl backbone containing about 15 to 20 carbon atoms such as stearic acid, isostearic acid, hydroxystearic acid, oleic acid, linoleic acid, linolenic acid, or eleostearic acid with an alkyl containing about 1 to 10 carbon atoms such as methyl, ethyl, propyl, isopropyl, butyl, isobutyl, tert-butyl, or 2-ethylhexyl.

Examples of the fluorocarbon include 1,1,1,2,2-pentafluoroethane, 1,1,1,2,2,3,3,4,4-nonafluorobutane, 1,1,1,2,2,3,3, 4,4,5,5,6,6-tridecafluorohexane, 1,1,1,2,2,3,3,4,4,5,5,6,6,7, 7,8,8-heptadecafluorooctane, 1,1,1,2,3,3,3-heptafluoropropane, 1,1,1,2,3,3,4,4-actafluoro-2-trifluoromethylbutane, 1,1,1,2,3,3,4,4,5,5,6,6-dodecafluoro-2-trifluoromethyl hexane, 1,1,2,2-tetrafluoroethane, 1,1,2,2, 3,3,4,4-octafluorobutane, and 1,1,2,2,3,3,4,4,5,5,6,6-dodecafluorohexane.

In the method for manufacturing printed material of the present invention, the lithographic printing ink to be coated on a substrate preferably contains at least one component selected from the group consisting of silicone fluid, alkyl (meth)acrylate, hydrocarbon solvent, plant oil, fatty acid ester derived from plant oil, and fluorocarbon at 0.5% by mass or more from the viewpoint of enhancing the scumming resistance. It is more preferably 1% by mass or more, and even more preferably 2% by mass or more. Furthermore, from the viewpoint of enhancing the storage stability of the lithographic printing ink, it is preferably contained at 10% by mass or less. It is more preferably 8% by mass or less, and even more preferably 5% by mass or less.

In the method for manufacturing printed material of the present invention, it is preferable that the lithographic printing ink to be coated on a substrate contains an oil-soluble surfactant (emulsifying agent). The emulsifying agent described herein indicates a surfactant which is dissolved in oil (organic compound insoluble in water), and, by taking water, forms a W/O type emulsion. When the lithographic printing ink contains an emulsifying agent, it takes an adequate amount (commonly 10 to 20% by mass of the entire ink) of the wetting water to undergo emulsification, and thus repellency of the non-printing part against the wetting water increases to thereby improve the scumming resistance.

The ratio of the hydrophilic group to the hydrophobic group in the emulsifying agent is represented by HLB value. The "HLB value" as described herein is a value indicating the degree of the affinity with water and oil of the surfactant. This HLB value may be a value of 0 to 20, and the value near 0 represents a higher lipophilicity while a value near 20 represents a higher hydrophilicity. The HLB value of the emulsifying agent is preferably 10 or more in view of favorable dissolving in water, and also preferably 11 or more. Furthermore, in view of favorable dissolving in the lithographic printing ink, it is preferably 18 or less, and more preferably 17 or less.

Specific examples of the emulsifying agent include polyoxyethylene alkyl ether, polyoxyethylene lauryl ether, polyoxyethylene oleyl ether, polyoxyethylene stearyl ether, polyoxyethylene cetyl ether, polyoxyethylene palmityl ether, polyoxypropylene alkyl ether, polyoxypropylene lauryl ether, polyoxypropylene oleyl ether, polyoxypropylene stearyl ether, polyoxypropylene cetyl ether, polyoxypropylene palmityl ether, polyoxyalkylene alkyl ether, polyoxyalkylene lauryl ether, polyoxyalkylene oleyl ether, polyoxyalkylene stearyl ether, polyoxyalkylene cetyl ether, and polyoxyalkylene palmityl ether; mono-, di-, and tri-alkyl ether of sorbitan acid, mono-, di-, and tri-lauryl ether of sorbitan acid, mono-, di-, and tri-oleyl ether of sorbitan acid, mono-, di-, and tri-stearyl ether of sorbitan acid, mono-, di-, and tri-cetyl ether of sorbitan acid, mono-, di-, and tri-palmityl ether of sorbitan acid; mono-, di-, and tri-alkyl ether of polyoxyethylene sorbitan acid, mono-, di-, and tri-lauryl ether of polyoxyethylene sorbitan acid, mono-, di-, and tri-oleyl ether of polyoxyethylene sorbitan acid, mono-, di-, and tri-stearyl ether of polyoxyethylene sorbitan acid, mono-, di-, and tri-cetyl ether of polyoxyethylene sorbitan acid, and mono-, di-, and tri-palmityl ether of polyoxyethylene sorbitan acid; and polyether-modified silicone oil. Those having a HLB value of 10 or more and 18 or less are preferably used.

In the method for manufacturing printed material of the present invention, in view of the intake of the wetting water in the course of printing and stabilization of the emulsified state, the lithographic printing ink to be coated on a substrate preferably contains an emulsifying agent at 0.01% by mass or more. It is more preferably 0.05% by mass or more, and even more preferably 0.10% by mass or more. Furthermore, in view of not having excessive intake of the wetting water in the lithographic printing ink during the printing and having non-compatibility with wetting water, the emulsifying agent is preferably 5.00% by mass or less. It is more preferably 3.00% by mass or less, and even more preferably 1.00% by mass or less.

In the method for manufacturing printed material of the present invention, it is preferable that the lithographic printing ink to be coated on a substrate contains a photopolymerization initiator and has UV curability. Furthermore, the lithographic printing ink preferably contains a sensitizing agent in addition to the photopolymerization initiator.

It is preferable that the photopolymerization initiator generates active radical species, and specific examples of the photopolymerization initiator include benzophenone, o-benzoyl methyl benzoate, 4,4-bis(dimethylamino)benzophenone (other name: Michler's ketone), 4,4-bis(diethylamino) benzophenone, 4,4'-dichlorobenzophenone, 4-benzoyl-4-methyldiphenyl ketone, 1-hydroxycyclohexyl-phenyl ketone, 4-phenylbenzophenone, hydroxybenzophenone, dibenzyl ketone, fluorenone, 2,2-diethoxyacetophenone, 2,2-dimethoxy-2-phenyl-2-phenylacetophenone, 2-hydroxy-2-methyl-1-phenylpropan-1-one, 1-[4-(2-hydroxyethoxy)-phenyl]-2-hydroxy-2-methyl-1-propan-1-one, p-t-butyldichloroacetophenone, thioxanthone, 2-methylthioxanthone, 2-chlorothioxanthone, 2-isopropylthioxanthone, 2,4-diethylthioxanthone, 2,4-dichlorothioxanthone, benzyldimethylketanol, benzylmethoxyethylacetal, benzoin, benzoinmethyl ether, benzoinethyl ether, benzoinisopropyl ether, benzoinbutyl ether, anthraquinone, 2-t-butylanthraquinone, 2-amylanthraquinone, β-chloroanthraquinone, anthrone, benzanthrone, dibenzosuberone, methylene anthrone, 4-azidebenzalacetophenone, 2,6-bis(p-azidobenzylidene)cyclohexanone, 2,6-bis(p-azidobenzylidene)-4-methylcyclohexanone, 2-phenyl-1,2-butadione-2-(o-methoxycarbonyl)oxime, 1-phenyl-1,2-propanedione-2-(o-ethoxycarbonyl)oxime, 1,3-diphenyl-propanetrione-2-(o-ethoxycarbonyl)oxime, 1-phenyl-3-ethoxypropanetrione-2-(o-benzoyl)oxime, 2-methyl-[4-(methylthio)phenyl]-2-morpholino-1-propan-1-one, 2-benzyl-2-dimethylamino-1-(4-morpholinophenyl)-butanone, naphthalene sulfonyl chloride, quinoline sulfonyl chloride, N-phenylthioacridone, 4,4-azobisisobutyronitrile, diphenyl disulfide, benzthiazole disulfide, triphenylphosphine, 2,4,6-trimethylbenzoyl-diphenyl-phosphine oxide, and bis(2,4,6-trimethylbenzoyl)-phenyl-phosphine oxide.

Specific examples of the sensitizing agent include 2-methylthioxanthone, 2-chlorothioxanthone, 2-isopropylthioxanthone, 2,4-diethylthioxanthone, 2,4-dichlorothioxanthone, 2,3-bis(4-diethylaminobenzal)cyclopentanone, 2,6-bis(4-dimethylaminobenzal)cyclohexanone, 2,6-bis(4-dimethylaminobenzal)-4-methylcyclohexanone, 4,4-bis(dimethylamino)-benzophenone (other name: Michler's ketone), 4,4-bis(diethylamino)-benzophenone, 4,4-bis(dimethylamino) chalcone, 4,4-bis(diethylamino)chalcone, p-dimethylaminocinnamylidene indanone, p-dimethylaminobenzylidene indanone, 2-(p-dimethylaminophenylvinylene)-isonaphthothiazole, 1,3-bis(4-dimethylaminobenzal)acetone, 1,3-carbonyl-bis(4-diethylaminobenzal) acetone, 3,3-carbonyl-bis(7-diethylaminocoumarine), N-phenyl-N-ethylethanolamine, N-phenylethanolamine, N-tolyldiethanolamine, methyl dimethylaminobenzoate, ethyl dimethylaminobenzoate, isoamyl dimethylaminobenzoate, methyl diethylaminobenzoate, ethyl diethylaminobenzoate, isoamyl diethylaminobenzoate, ethyl dieethylaminobenzoate, isoamyl diethylaminobenzoate, 3-phenyl-5-benzoyl thiotetrazole, and 1-phenyl-5-ethoxycarbonyl thiotetrazole.

In the method for manufacturing printed material of the present invention, one or more of the photopolymerization initiator or sensitizing agent can be used for the lithographic printing ink to be coated on a substrate.

As the photopolymerization initiator is contained at 0.1% by mass or more in the lithographic printing ink, favorable sensitivity is obtained, and therefore desirable. It is more preferable to contain the photopolymerization initiator at 1.0% by mass or more, and even more preferably at 3.0% by mass or more. Furthermore, from the viewpoint that the storage stability of the ink is enhanced, the photopolymerization initiator is contained at 20.0% by mass or less. It is more preferably 15.0% by mass or less, and even more preferably 10.0% by mass or less.

Furthermore, in case of adding a sensitizing agent, the content is preferably 0.1% by mass or more relative to the ink from the viewpoint of obtaining favorable sensitivity. The content is more preferably 1.0% by mass or more, and even more preferably at 3.0% by mass or more. Furthermore, from the viewpoint that the storage stability of the ink is enhanced, the content is 20.0% by mass or less. It is more preferably 15.0% by mass or less, and even more preferably 10.0% by mass or less.

In the method for manufacturing printed material of the present invention, the lithographic printing ink to be coated on a substrate is preferably added with a polymerization inhibitor to enhance the stability during storage. Specific examples of the polymerization inhibitor include hydroquinone, monoether compound of hydroquinone, N-nitrosodiphenylamine, phenothiazine, p-t-butylcatechol, N-phenylnaphthylamine, 2,6-di-t-butyl-p-methyl phenol, chloranil, and pyrogallol. From the viewpoint of obtaining favorable storage stability, the addition amount of the polymerization inhibitor is preferably 0.01% by mass or more and 5.00% by mass or less relative to the ink.

In the method for manufacturing printed material of the present invention, additives such as wax, antifoaming agent, or transfer improving agent can be used for the lithographic printing ink to be coated on a substrate, if necessary.

In the method for manufacturing printed material of the present invention, as the substrate of printed material, it is preferable to use a gloss-type coated paper obtained by applying, on high quality paper or medium quality paper, a coating material in which a white pigment such as clay and calcium carbonate and adhesives such as starch followed by smoothening treatment of the surface. Examples of the gloss-type coated paper include art paper, coated paper, and cast paper, but it is not limited thereto. By using gloss-type coated paper, surface of the ink transferred to a substrate can be easily smoothened so that gloss of printed material is enhanced.

In the present invention, the gloss-type coated paper is preferably coated paper which has 75o specular gloss of 20% or higher, in which 75o specular gloss is as described in JIS P 8142:2005.

In the method for manufacturing printed material of the present invention, the method for coating on a substrate can be carried out by lithographic printing to have coating on a substrate. As for the mode of lithographic printing, there is printing with water and printing without water, and any of those modes can be used.

Ink coating film on printed material preferably has thickness of 0.1 to 50.0 μm. As the thickness of the ink coating film is within this range, ink cost can be reduced while maintaining favorable printing quality.

<Lithographic Printing Ink Set>

The lithographic printing ink set of the present invention is characterized in that it is a lithographic printing ink set containing at least black ink, cyan ink, magenta ink, and yellow ink characterized in that a difference in surface tension between inks included in the lithographic printing ink set is at most equal to 3.5 mN/m. It means that, for surface tension of each of the black ink, cyan ink, magenta ink, and yellow ink which constitute the lithographic printing ink set, the difference between the maximum surface tension and the minimum surface tension is at most equal to 3.5 mN/m. As the difference in surface tension is at most equal to 3.5 mN/m, wettability of upper layer ink for lower layer ink is improved in a printed part in which multiple colors are superimposed on each other and it becomes easier to have a smooth upper layer, and thus gloss of printed material is improved. The difference in surface tension between inks is more preferably at most equal to 3.0 mN/m, and even more preferably at most equal to 2.5 mN/m. Surface tension of each ink can be controlled based on type and/or content of at least one selected from a resin, polyfunctional (meth)acrylate, and a surfactant to be contained in each ink. Accordingly, the difference in surface tension between the inks can be controlled by modifying the type of the resin, polyfunctional (meth)acrylate, and/or surfactant to be contained in the ink, or by increasing or decreasing their content.

Surface tension of the ink to be contained in the lithographic printing ink set of the present invention is preferably 45 mN/m or more and 60 mN/m or less. This means that, surface tension of each of the black ink, cyan ink, magenta ink, and yellow ink constituting the lithographic printing ink set is 45 mN/m or more and 60 mN/m or less. As it has been described in <Method for manufacturing printed material>, as the surface tension of lithographic printing ink is 45 mN/m or more, it becomes easier for the ink to be released when it is transferred from a blanket to a substrate, and, as surface of the ink transferred onto a substrate is smooth, printed material can have more improved gloss. More preferably, the surface tension of the ink is 48 mN/m or more, and even more preferably 51 mN/m or more. Furthermore, as the surface tension of the lithographic printing ink is 60 mN/m or less, transferability of the ink onto a blanket is improved. The surface tension of the lithographic printing ink is more preferably 58 mN/m or less, and even more preferably 56 mN/m or less.

In lithographic printing, printed material is obtained by transferring, in turn, inks on a substrate, and according to the order of transferring inks, a variation in gloss of printed material is caused. In lithographic printing, inks are generally transferred in order of black ink, cyan ink, magenta ink, and yellow ink onto a substrate.

Tack value (1 minute value) of the black ink included in the lithographic printing ink set of the present invention is preferably 5.0 or more and 8.0 or less, in which the tack value is obtained by measurement using an inkometer at 38° C. with rotation number of 400 rpm. As it has been described in <Method for manufacturing printed material>, the tack value of black ink is more preferably 5.5 or more, and even more preferably 6.0 or more in order to prevent back trapping or printing defects such as poor transferability. Furthermore, if tack value of the ink is high, it is easy to have an occurrence of irregularities on a surface of ink transferred onto a substrate, thus yielding lower gloss of printed material. In a printed part in which colors are superimposed on each other, in particular, once irregularities are formed on a surface of lower layer ink, the gloss further decreases as it is affected from the irregularities. In order to increase the gloss of a printed part in which colors are superimposed on each other, tack value of the black ink for lithographic printing is more preferably 7.5 or less, and even more preferably 7.0 or less.

Furthermore, tack value (1 minute value) of the cyan ink for lithographic printing, the magenta ink for lithographic printing, and the yellow ink for lithographic printing to be coated on a substrate is, similar to the black ink for lithographic printing, preferably 5.0 or more and 8.0 or less, and more preferred range is also the same as above. In order to prevent the back trapping, it is preferable to lower the tack property of the ink in accordance with printing order. When printing is carried out in the order of black ink, cyan ink, magenta ink, and yellow ink, tack value of each ink is preferably adjusted in ascending order of black ink, cyan ink, magenta ink, and yellow ink.

Viscosity (A) at rotation number of 0.5 rpm of the ink included in the lithographic printing ink set of the present invention is preferably 5 Pa·s or more and 200 Pa·s or less. As the viscosity (A) is 5 Pa·s or more, roller-to-roller transferability of the ink is enhanced. More preferably, the viscosity (A) is 10 Pa·s or more, and even more preferably 20 Pa·s or more. Furthermore, as the viscosity (A) is 200 Pa·s or less, fluidity of the ink becomes favorable and it is easier for the ink transferred onto a substrate to have smoothness, and thus gloss of printed material is enhanced. More preferably, the viscosity (A) is 150 Pa·s or less, and even more preferably 100 Pa·s or less.

Both viscosity (B) at rotation number of 20 rpm (corresponding to shear speed of $120\ s^{-1}$) and viscosity (C) at rotation number of 50 rpm of the ink included in the lithographic printing ink set of the present invention are preferably 5 Pa·s or more and 200 Pa·s or less. As both of the viscosity (B) and viscosity (C) are 5 Pa·s or more, higher aggregation force of the ink is obtained so that the scumming resistance of the ink can be enhanced. They are more preferably 10 Pa·s or more, and even more preferably 15 Pa·s or more. Furthermore, as the viscosity (B) and viscosity (C) are 200 Pa·s or less, a favorable adhesion property of the ink onto a lithographic printing plate is obtained. They are more preferably 40 Pa·s or less, and even more preferably 20 Pa·s or less.

Viscosity ratio (C)/(B), which is the ratio between the viscosity (B) and the viscosity (C) of the inks included in the lithographic printing ink set of the present invention, is preferably 0.75 or more and 1.00 or less. As the viscosity ratio (C)/(B) is within the above range, aggregation force of the ink is sufficiently maintained even under high speed and high shear conditions during printing, and thus the scumming resistance of the ink can be enhanced. More preferably, the ratio is 0.80 or more and 1.00 or less, and even more preferably 0.90 or more and 1.00 or less.

To have the aforementioned viscosity ratio (C)/(B) within a desired range, the ink included in the lithographic printing ink set of the present invention preferably contains a resin having a hydrophilic group and polyfunctional (meth)acrylate having a hydroxyl group. It is considered that, because the hydrophilic group and hydroxyl group allow a favorable pigment dispersibility in the ink, they reduce the structural viscosity of the ink (high viscosity resulting from aggregated structure made by pigment) so as to yield lower viscosity of ink at low shear conditions. It is considered that, as the ink viscosity is low under low shear conditions, printed material in which the ink included in the lithographic printing ink set of the present invention is used can exhibit high gloss. Furthermore, the resin having a hydrophilic group is dissolved in the polyfunctional (meth)acrylate having a hydroxyl group, and high viscosity is yielded based on an interaction such as hydrogen bond between the hydrophilic group and hydroxyl group, or the like. The dissolved product is Newtonian fluid, and can maintain constant viscosity without depending on the shearing strength. In the lithographic printing ink, viscosity of the above dissolved product as a medium becomes dominant in a high shear region (rotation number of 20 rpm or more) after the structural viscosity has degraded so that the viscosity decrease caused by shearing is small, and thus high viscosity is maintained under high shear conditions. As a result, since the ink can have high aggregation force and ink repellency against non-printing part is improved under high shear conditions such as printing, scumming resistance is enhanced.

The ink included in the lithographic printing ink set of the present invention may contain a resin having a hydrophilic group, polyfunctional (meth)acrylate, a pigment, and a surfactant.

It is considered that ink fluidity can be enhanced as the pigment in ink is dispersion-stabilized by hydrophilic group in the resin having a hydrophilic group. As the ink fluidity is enhanced, the ink transferred onto a substrate can be more easily smoothened, and thus gloss of printed material is enhanced. Furthermore, based on an interaction such as hydrogen bond, the hydrophilic group increases the aggregation force of ink under high shear conditions during printing. Since the ink repellency against non-printing part is improved as the ink has higher aggregation force, scumming resistance is enhanced consequently. As the ink included in the lithographic printing ink set of the present invention contains a resin having a hydrophilic group, the ink becomes soluble in aqueous cleaning solution in which water is contained as a main component, and thus application of a non-petroleum cleaning agent can be made. Furthermore, by adjusting the type and/or content of a resin having a hydrophilic group, surface tension of the lithographic printing ink can be either increased or decreased, thus contributing to adjusting a difference in surface tension of the lithographic printing ink to a value of at most equal to 3.5 mN/m.

Examples of the hydrophilic group of the resin having a hydrophilic group include a hydroxyl group, an amino group, a mercapto group, a carboxyl group, a sulfo group, and a phosphoric acid group. Among them, a carboxyl group having favorable property of dispersing a pigment is particularly preferable.

Acid value of the resin having a hydrophilic group is preferably 30 mgKOH/g or more from the viewpoint of obtaining favorable solubility in an aqueous cleaning solution, pigment dispersibility, scumming resistance of the resin. The acid value is more preferably 60 mgKOH/g or more, and even more preferably 75 mgKOH/g or more. Furthermore, as the acid value is 200 mgKOH/g or less, an interaction such as hydrogen bond is suppressed so that fluidity of the lithographic printing ink of the present invention can be maintained and the tack (adhesiveness) can be lowered, and thus preferable. The acid value is more preferably 170 mgKOH/g or less, and even more preferably 150 mgKOH/g or less. As the acid value is within the above range, pigment dispersibility, scumming resistance, and fluidity of the ink can be maintained at favorable level.

Solubility of the resin having a hydrophilic group in water is preferably 0.1 g/(100 g-$H_2O$) or more. As the solubility is within this range, cleaning using an aqueous cleaning solution can be easily carried out. Solubility of the resin having a hydrophilic group in water is more preferably 0.3 g/(100 g-$H_2O$) or more, and even more preferably 0.5 g/(100 g-$H_2O$) or more. Although more favorable water cleaning property can be obtained as the solubility in water increases, because the water resistance of ink cured film is impaired if the solubility is excessively high, the solubility of the resin having a hydrophilic group in water is preferably 100 g/(100 g-$H_2O$) or less, more preferably 50 g/(100 g-$H_2O$) or less, and even more preferably 10 g/(100 g-$H_2O$) or less. Furthermore, the solubility indicates the mass (g) of the resin dissolved in 100 g of water at 25° C.

When the weight average molecular weight of the resin having a hydrophilic group is 5,000 or more, the scumming resistance of the lithographic printing ink is enhanced, and thus preferable. It is more preferably 15,000 or more, and even more preferably 20,000 or more. Furthermore, when the weight average molecular weight is 100,000 or less, fluidity of the lithographic printing ink is maintained so as to reduce the tack (adhesiveness), and thus preferable. The weight average molecular weight is more preferably 75,000 or less, and even more preferably 50,000 or less. Furthermore, the weight average molecular weight can be obtained by using gel permeation chromatography (GPC) and carrying out measurement with use of polystyrene as a reference.

Examples of the resin having a hydrophilic group include acrylic resin, styrene acrylic resin, styrene maleic acid resin, rosin-modified maleic acid resin, rosin-modified acrylic resin, epoxy resin, polyester resin, polyurethane resin, and phenol resin, but it is not particularly limited. Of the resins as described above, acrylic resin, styrene acrylic resin, and styrene maleic acid resin are preferably used as the resin having a hydrophilic group in view of availability of the monomer, low cost, easy synthesis, compatibility with other components of the ink, pigment dispersibility, and the like.

Of the resins as described above, acrylic resin, styrene acrylic acid resin, and styrene maleic acid resin can be obtained by the following method. Namely, they are obtained by polymerizing or copolymerizing, by using a radical polymerization initiator, a compound selected from a carboxyl group-containing monomer such as acrylic acid, methacrylic acid, itaconic acid, crotonic acid, maleic acid, fumaric acid, vinyl acetate, or an acid anhydride thereof, a hydroxyl group-containing monomer such as 2-hydroxyethyl acrylate, an amino group-containing monomer such as dimethylamino ethyl methacrylate, a mercapto group-containing monomer such as 2-(mercaptoacetoxy)ethyl acrylic acid, a sulfo group-containing monomer such as acryl amide t-butyl sulfonic acid, a phosphate group-containing monomer such as 2-methacryloyloxy ethyl acid phosphate, methacrylate, acrylate, styrene, acrylonitrile, vinyl acetate, and the like.

Specific examples of the resin having a hydrophilic group include (meth)acrylic acid copolymer, (meth)acrylic acid-(meth)acrylate copolymer, styrene-(meth)acrylic acid copolymer, styrene-(meth)acrylic acid-(meth)acrylate copolymer, styrene-maleic acid copolymer, styrene-maleic acid-(meth)acrylic acid copolymer, and styrene-maleic acid-(meth)acrylate copolymer.

From the viewpoint having easy curing by active energy ray, it is preferable that the resin having a hydrophilic group has an ethylenic unsaturated group. Iodine value of the ethylenic unsaturated group in the resin having a hydrophilic group and an ethylenic unsaturated group is preferably 0.5 mol/kg or more and 3.0 mol/kg or less. As the iodine value is within the above range, the ink can be easily cured by active energy ray, and the acid value of the resin having a hydrophilic group and an ethylenic unsaturated group can be easily adjusted to a suitable range. The iodine value of the ethylenic unsaturated group is more preferably 1.0 mol/kg or more, and even more preferably 1.5 mol/kg or more to promote the ink curing. Furthermore, to easily adjust the acid value of the resin having a hydrophilic group and an ethylenic unsaturated group to a more suitable range, the iodine value is more preferably 2.7 mol/kg or less, and even more preferably 2.4 mol/kg or less.

The resin having a hydrophilic group and an ethylenic unsaturated group can be manufactured by a following method. Namely, according to an addition reaction of an ethylenic unsaturated compound containing glycidyl group or isocyanate group, acrylic acid chloride, methacrylic acid chloride, or allyl chloride to the active hydrogen-containing group in the resin having a hydrophilic group such as mercapto group, amino group, hydroxyl group, or carboxyl group, the resin having a hydrophilic group and an ethylenic unsaturated group is obtained. However, the method is not limited to the method as described above.

Furthermore, specific examples of the ethylenic unsaturated compound having a glycidyl group include glycidyl acrylate, glycidylmethacrylate, allyl glycidyl ether, glycidyl crotonate, and glycidyl isocrotonate.

Furthermore, specific examples of the ethylenic unsaturated compound having an isocyanate group include acryloyl isocyanate, methacryloyl isocyanate, acryloyl ethyl isocyanate, and methacryloyl ethyl isocyanate.

In the ink included in the lithographic printing ink set of the present invention, when content of the resin having a hydrophilic group is 5% by mass or more, pigment dispersibility in ink and scumming resistance of the ink are improved, and thus preferable. The content is more preferably 8% by mass or more, and even more preferably 11.5% by mass or more. Furthermore, when content of the resin having a hydrophilic group is 30% by mass or less, fluidity of the ink is maintained so as to reduce the tack (adhesiveness), and thus preferable. The content is more preferably 20% by mass or less, and even more preferably 14% by mass or less.

It is preferable for the ink included in the lithographic printing ink set of the present invention to contain polyfunctional (meth)acrylate. Because polyfunctional (meth)acrylate has a double bond group, the ink can be easily cured by active energy ray. Furthermore, by adjusting the type and/or content of polyfunctional (meth)acrylate, surface tension of the lithographic printing ink can be either increased or decreased, thus contributing to adjusting the difference in surface tension of the lithographic printing ink to be coated on a substrate to 3.5 mN/m or less.

The polyfunctional (meth)acrylate is not particularly limited as long as it is a compound having two or more (meth)acrylate groups. Number of the (meth)acrylate group (hereinbelow, it may be also referred to as "number of the functional group") is preferably 2 or more, more preferably 3 or more, and even more preferably 4 or more. Furthermore, number of the functional group in polyfunctional (meth)acrylate is preferably 8 or less, more preferably 7 or less, and even more preferably 6 or less.

It is preferable that the polyfunctional (meth)acrylate has a polar group. Examples of the polar group include a hydroxyl group and a carboxy group, and, of those, it is preferable to have a hydroxyl group. It is considered that the polar group such as hydroxyl group can disperse and stabilize the pigment, and thus fluidity of the ink is enhanced. As the fluidity of the ink is enhanced, the ink transferred to a substrate can be easily smoothened, thus yielding enhanced gross of printed material. Furthermore, based on an interaction such as hydrogen bond, the polar group such as hydroxyl group increases the aggregation force of ink under high shear conditions during printing. Since the ink repellency against non-printing part is improved as the ink has higher aggregation force, scumming resistance is enhanced consequently.

Hydroxyl value of the polyfunctional (meth)acrylate is preferably 50 mgKOH/g or more from the viewpoint of having enhanced pigment dispersibility and also scumming resistance of the ink. The hydroxyl value is more preferably 75 mgKOH/g or more, and even more preferably 100 mgKOH/g or more. Furthermore, as the hydroxyl value is 200 mgKOH/g or less, an interaction such as hydrogen bond is suppressed and favorable fluidity of the ink is maintained so that the tack (adhesiveness) can be lowered, and thus preferable. The hydroxyl value is more preferably 180 mgKOH/g or less, and even more preferably 160 mgKOH/g or less.

Molecular weight of the polyfunctional (meth)acrylate is preferably 100 or more since the scumming resistance of the ink can be enhanced. The molecular weight is more preferably 200 or more, and even more preferably 250 or more. Furthermore, as the molecular weight is 1,000 or less, favorable fluidity of the ink can be maintained and the tack (adhesiveness) can be lowered, and thus preferable. The molecular weight is more preferably 700 or less, and even more preferably 500 or less.

Specific examples of the polyfunctional (meth)acrylate include, as bifunctional (meth)acrylate, ethylene glycol di(meth)acrylate, diethylene glycol di(meth)acrylate, triethylene glycol di(meth)acrylate, polyethylene glycol di(meth)acrylate, tripropylene glycol di(meth)acrylate, 1,3 butylene gylcol di(meth)acrylate, 1,6 hexane diol di(meth)acrylate, 1,9 nonane diol di(meth)acrylate, and neopentyl glycol di(meth)acrylate, as trifunctional (meth)acrylate, trimethylolpropane tri(meth)acrylate, glycerin tri(meth)acrylate, isocyanuric acid tri(meth)acrylate, and ethylene oxide adduct or propylene oxide adduct thereof, as tetraifunctional (meth) acrylate, pentaerythritol tetra(meth)acrylate, ditrimethylolpropane tetra(meth)acrylate, diglycerin tetra(meth)acrylate, and ethylene oxide adduct or propylene oxide adduct thereof, and as penta- or higher functional (meth)acrylate, dipentaerythritol hexa(meth)acrylate, and ethylene oxide adduct or propylene oxide adduct thereof. Furthermore, specific examples of preferred polyfunctional (meth)acrylate having a hydroxyl group include poly (meth)acrylate of polyhydric alcohol such as trimethylolpropane, glycerin, pentaerythritol, diglycerin, ditrimethylolpropane, isocyanuric acid, or dipentaerythritol, and an alkylene oxide adduct thereof. More specific examples thereof include di(meth) acrylate of trimethylolpropane, di(meth)acrylate of glycerin, di- or tri(meth)acrylate of pentaerythritol, di- or tri(meth) acrylate of diglycerin, di- or tri(meth)acrylate of ditrimethylolpropane, di-, tri-, tetra-, or penta(meth)acrylate of dipentaerythritol, and ethylene oxide adduct, propylene oxide adduct, or tetraethylene oxide adduct thereof. Among those described above, from the viewpoint that the lithographic printing ink of the present invention has excellent fluidity and pigment dispersibility and also enhanced scumming resistance, pentaerythritol tri(meth)acrylate, diglycerin tri (meth)acrylate, and ditrimethylolpropane tri(meth)acrylate are particularly preferable.

When the ink included in the lithographic printing ink set of the present invention contains the polyfunctional (meth) acrylate at 20% by mass or more, pigment dispersibility and scumming resistance of the ink are enhanced, and thus preferable. It is more preferably 30% by mass or more, and even more preferably 40% by mass or more. Furthermore, it is preferably 75% by mass or less because the favorable fluidity of the ink can be maintained. It is more preferably 70% by mass or less, and even more preferably 65% by mass or less.

With regard to the surface tension of the ink, basically, higher surface tension is yielded as the amount of a polar group increases in the ink while lower surface tension is yielded as the amount of a polar group decreases in the ink. By adjusting the content of the resin having a hydrophilic group and the polyfunctional (meth)acrylate having a hydroxyl group, the amount of the polar group in the ink is modified so that the difference in surface tension between the inks contained in lithographic printing ink set can be easily adjusted to 3.5 mN/m or less. The difference in surface tension of the inks to be coated on a substrate can be controlled based on type and/or content of the resin having a hydrophilic group and polyfunctional (meth)acrylate. In addition to them, or independently, the difference in surface tension of the inks to be coated on a substrate can be controlled based on type and/or content of the surfactant, pigment, or diluents.

To easily adjust the surface tension of the ink to 45 mN/m or more and 60 mN/m or less while ensuring the fluidity and scumming resistance of the ink, it is preferable that the acid value of the resin having a hydrophilic group is 60 mgKOH/g or more and 200 mgKOH/g or less, content of the resin having a hydrophilic group is 11.5% by mass or more and 14% by mass or less, hydroxyl value of the polyfunctional (meth)acrylate having a hydroxyl group is 50 mgKOH/g or more and 200 mgKOH/g or less, and content of the polyfunctional (meth)acrylate having a hydroxyl group is 20% by mass or more and 30% by mass or less.

With regard to the black ink for lithographic printing, to easily adjust the tack value to 5.0 or more and 8.0 or less while ensuring the scumming resistance, it is preferable that the acid value of the resin having a hydrophilic group is 60 mgKOH/g or more and 200 mgKOH/g or less, weight average molecular weight of the resin having a hydrophilic group is 15,000 or more and 50,000 or less, content of the resin having a hydrophilic group is 11.5% by mass or more and 14% by mass or less, hydroxyl value of the polyfunctional (meth)acrylate having a hydroxyl group is 50 mgKOH/g or more and 200 mgKOH/g or less, and content of the polyfunctional (meth)acrylate having a hydroxyl group is 20% by mass or more and 30% by mass or less.

It is preferable that the ink included in the lithographic printing ink set of the present invention contains a surfactant. From the viewpoint of adjusting the difference between surface tension of the lithographic printing ink and surface tension of the lithographic printing ink in addition to having enhanced fluidity of the lithographic printing ink, content of the surfactant is 5% by mass or more and 50% by mass or less relative to the pigment.

Specific examples of the surfactant include "Anti-Terra-U (polyaminoamide phosphate)", "Anti-Terra-203/204 (high molecular weight polycarboxylic acid salt)", "Disperbyk-101 (acid ester with polyaminoamide phosphate), 102, 103, 106, 107 (carboxylic acid ester containing hydroxyl group), 110, 111 (copolymerization product containing acid group), 115, 118, 130 (polyamide), 140, 142, 145, 161, 162, 163, 164, 165, 166, 167, 168, 170 (high molecular weight copolymerization product), 171, 174, 180, 181, 182, 184, 185, 187, 190, 191, 192, 193, 199, 2000, 2001, 2008, 2009, 2010, 2012, 2013, 2015, 2022, 2025, 2026, 2050, 2055, 2060, 2061, 2070, 2096, 2150, 2151, 2152, 2155, 2163, 2164, 2200, 2205, 9067, 9076", "Bykumen" (high molecular weight unsaturated acid ester), "BYK-P104, P105 (high molecular weight unsaturated acid polycarboxylic acid)", "P104S, 240S (high molecular weight unsaturated acid polycarboxylic acid and silicone based)", and "Lactimon (long-chain amine and unsaturated polycarboxylic acid and silicone)" manufactured by BYK Chemie.

Furthermore, "Efka 44, 46, 47, 48, 49, 54, 63, 64, 65, 66, 71, 701, 764, 766", "Efkapolymer 100 (modified polyacrylate), 150 (aliphatic modified polymer), 400, 401, 402, 403, 450, 451, 452, 453 (modified polyacrylate), and 745 (copper phthalocyanin-based)" manufactured by Efka CHEMICALS, "Flowlen TG-710 (urethane oligomer), "Flownon SH-290, SP-1000", and "Polyflow No. 50E, No. 300 (acrylic copolymerization product)" manufactured by Kyoei Chemical Co., Ltd., and "Disparlon 325, KS-860, 873SN, 874 (polymer dispersing agent), 1401, #2150 (aliphatic polyhydric carboxylic acid), and #7004 (polyether ester type)" manufactured by Kusumoto Chemicals, Ltd. can be mentioned.

Furthermore, "Demol RN and N (both being naphthalene sulfonic acid formalin condensation product sodium salts), MS, C, and SN-B (all are aromatic sulfonic acid formalin condensation product sodium salts), and EP", "Homogenol L-18 (a polycarboxylic acid type polymer)", "Emulgen 920, 930, 931, 935, 950, and 985 (all are polyoxyethylene nonyl phenyl ethers)", and "Acetamin 24 (coconut amine acetate) and 86 (stearylamine acetate)", all manufactured by Kao Corp., "Solsperse 5000 (phthalocyanine ammonium salt based dispersing agent), 13940 (polyesteramine based dispersing agents), 17000 (fatty acid amine based dispersing agent), 24000 GR, 32000, 33000, 39000, 41000, 53000", all manufactured by Avecia, "Nikkol T106 (polyoxyethylene sorbitan monooleate), MYS-IEX (polyoxyethylene monostearate), and Hexagline 4-0 (hexaglyceryl tetraoleate)", all manufactured by Nikko Chemicals Co., Ltd., and "AJISPER PB821, 822, 824" manufactured by Ajinomoto Fine-Techno Inc., Co. can be mentioned.

The ink included in the lithographic printing ink set of the present invention may preferably contain a pigment. As for the pigment, one or more kind selected from an inorganic pigment and an organic pigment that are generally used for a lithographic printing ink composition can be used.

Specific examples of the inorganic pigment include titanium dioxide, calcium carbonate, barium sulfate, bengala, cadmium red, chrome yellow, zinc yellow, Prussian blue, ultramarine, organic bentonite, alumina white, iron oxide, carbon black, graphite, and aluminum.

Examples of the organic pigment include phthalocyanine pigments, soluble azo pigments, insoluble azo pigments, lake pigments, quinacridone pigments, isoindoline pigments, threne pigment, metal complex pigments, and more specifically, phthalocyanine blue, phthalocyanine green, azo red, monoazo red, monoazo yellow, diazo red, diazo yellow, quinacridone red, quinacridone magenta, and isoindoline yellow can be mentioned.

The pigment concentration is preferably 5% by mass or more, more preferably 10% by mass or more, and even more preferably 15% by mass or more to obtain printed paper surface concentration. Furthermore, in order to obtain enhanced fluidity of the ink and favorable roller-to-roller transferability, the pigment concentration is preferably 40% by mass or less, more preferably 30% by mass or less, and even more preferably 25% by mass or less.

The ink included in the lithographic printing ink set of the present invention preferably contains at least one component selected from silicone fluid, alkyl (meth)acrylate, hydrocarbon solvent, plant oil, fatty acid ester derived from plant oil, and fluorocarbon.

The above component has an effect of reducing deposition of the ink to the silicone rubber which is the non-printing part in the waterless offset printing plate, and, as a result, printed material free of any scum is obtained. Presumably, the deposition of the ink to the silicone rubber is reduced as follows. Namely, as the component contained in the ink diffuses into the ink in accordance with contact with silicone rubber surface, it covers the silicone rubber surface, in the form of a thin film. It is believed that a thin film formed accordingly prevents the deposition of the ink to the silicone rubber surface so as to prevent staining on the silicone surface.

Of the components as described above, alkyl (meth)acrylate is preferable since it is cured with the irradiation of the active energy ray to improve the physical property of a cured film of the ink and also to enhance simultaneously the sensitivity to active energy ray.

Specific compounds of the above components are as follows.

Examples of the silicone fluid include dimethyl silicone, methylphenylsilicone, alkyl-modified silicone, polyether-modified silicone, aralkyl-modified silicone, fatty acid amide-modified silicone, fatty acid ester-modified silicone, fluoroalkyl-modified silicone, methyl hydrogen silicone, silanol-modified silicone, alcohol-modified silicone, amino-modified silicone, epoxy-modified silicone, epoxy polyether-modified silicone, phenol-modified silicone, carboxy-modified silicone, and mercapto-modified silicone.

Examples of the alkyl (meth)acrylate include nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, and isooctadecyl (meth)acrylate.

Examples of the hydrocarbon solvent include polyolefin oil, naphthene oil, and paraffin oil.

Examples of the plant oil include soybean oil, linseed oil, safflower oil, tung oil, sesame oil, and dehydrated castor oil.

Examples of the fatty acid ester derived from plant oil include esters of a fatty acid having an alkyl backbone containing about 15 to 20 carbon atoms such as stearic acid, isostearic acid, hydroxystearic acid, oleic acid, linoleic acid, linolenic acid, or eleostearic acid with an alkyl containing about 1 to 10 carbon atoms such as methyl, ethyl, propyl, isopropyl, butyl, isobutyl, tert-butyl, or 2-ethylhexyl.

Examples of the fluorocarbon include 1,1,1,2,2-pentafluoroethane, 1,1,1,2,2,3,3,4,4-nonafluorobutane, 1,1,1,2,2,3,3,4,4,5,5,6,6-tridecafluorohexane, 1,1,1,2,2,3,3,4,4,5,5,6,6,7,7,8,8-heptadecafluorooctane, 1,1,1,2,3,3,3-heptafluoropropane, 1,1,1,2,3,3,4,4-actafluoro-2-trifluoromethylbutane, 1,1,1,2,3,3,4,4,5,5,6,6-dodecafluoro-2-trifluoromethyl hexane, 1,1,2,2-tetrafluoroethane, 1,1,2,2,3,3,4,4-octafluorobutane, and 1,1,2,2,3,3,4,4,5,5,6,6-dodecafluorohexane.

The ink included in the lithographic printing ink set of the present invention preferably contains at least one component selected from silicone fluid, alkyl (meth)acrylate, hydrocarbon solvent, plant oil, fatty acid ester derived from plant oil, and fluorocarbon at 0.5% by mass or more from the viewpoint of enhancing the scumming resistance. It is more preferably 1% by mass or more, and even more preferably 2% by mass or more. Furthermore, from the viewpoint of enhancing the storage stability of the lithographic printing ink, it is preferably contained at 10% by mass or less. It is more preferably 8% by mass or less, and even more preferably 5% by mass or less.

It is preferable that the ink included in the lithographic printing ink set of the present invention contains an oil-soluble surfactant (emulsifying agent). The emulsifying agent described herein indicates a surfactant which is dissolved in oil (organic compound insoluble in water), and, by taking water, forms a W/O type emulsion. When the lithographic printing ink contains an emulsifying agent, it takes an adequate amount (commonly 10 to 20% by mass of the entire ink) of the wetting water to undergo emulsification, and thus repellency of the non-printing part against the wetting water increases to thereby improve the scumming resistance.

The ratio of the hydrophilic group to the hydrophobic group in the emulsifying agent is represented by HLB value. The "HLB value" as described herein is a value indicating the degree of the affinity with water and oil of the surfactant. This HLB value may be a value of 0 to 20, and the value near 0 represents a higher lipophilicity while a value near 20 represents a higher hydrophilicity. The HLB value of the emulsifying agent is preferably 10 or more in view of favorable dissolving the water, and also preferably 11 or more. Furthermore, in view of favorable dissolving in the lithographic printing ink, it is preferably 18 or less, and more preferably 17 or less.

Specific examples of the emulsifying agent include polyoxyethylene alkyl ether, polyoxyethylene lauryl ether, polyoxyethylene oleyl ether, polyoxyethylene stearyl ether, polyoxyethylene cetyl ether, polyoxyethylene palmityl ether, polyoxypropylene alkyl ether, polyoxypropylene lauryl ether, polyoxypropylene oleyl ether, polyoxypropylene stearyl ether, polyoxypropylene cetyl ether, polyoxypropylene palmityl ether, polyoxyalkylene alkyl ether, polyoxyalkylene lauryl ether, polyoxyalkylene oleyl ether, polyoxyalkylene stearyl ether, polyoxyalkylene cetyl ether, and polyoxyalkylene palmityl ether; mono-, di-, and tri-alkyl ether of sorbitan acid, mono-, di-, and tri-lauryl ether of sorbitan acid, mono-, di-, and tri-oleyl ether of sorbitan acid, mono-, di-, and tri-stearyl ether of sorbitan acid, mono-, di-, and tri-cetyl ether of sorbitan acid, mono-, di-, and tri-palmityl ether of sorbitan acid; mono-, di-, and tri-alkyl ether of polyoxyethylene sorbitan acid, mono-, di-, and tri-lauryl ether of polyoxyethylene sorbitan acid, mono-, di-, and tri-oleyl ether of polyoxyethylene sorbitan acid, mono-, di-, and tri-stearyl ether of polyoxyethylene sorbitan acid, mono-, di-, and tri-cetyl ether of polyoxyethylene sorbitan acid, and mono-, di-, and tri-palmityl ether of polyoxyethylene sorbitan acid; and polyether-modified silicone oil. Those having a HLB value of 10 or more and 18 or less are preferably used.

In view of the intake of the wetting water in the course of printing and the stabilization of the emulsified state, the ink included in the lithographic printing ink set of the present invention preferably contains an emulsifying agent at 0.01% by mass or more. It is more preferably 0.05% by mass or more, and even more preferably 0.10% by mass or more. Furthermore, in view of not having excessive intake of the wetting water in the lithographic printing ink during the printing and having non-compatibility with wetting water, the emulsifying agent is preferably 5.00% by mass or less. It is more preferably 3.00% by mass or less, and even more preferably 1.00% by mass or less.

It is preferable that the ink included in the lithographic printing ink set of the present invention contains a photopolymerization initiator and has UV curability. Furthermore, the lithographic printing ink preferably contains a sensitizing agent in addition to the photopolymerization initiator.

It is preferable that the photopolymerization initiator generates active radical species, and specific examples of the photopolymerization initiator include benzophenone, o-benzoyl methyl benzoate, 4,4-bis(dimethylamino)benzophenone (other name: Michler's ketone), 4,4-bis(diethylamino) benzophenone, 4,4'-dichlorobenzophenone, 4-benzoyl-4-methyldiphenyl ketone, 1-hydroxycyclohexyl-phenyl ketone, 4-phenylbenzophenone, hydroxybenzophenone, dibenzyl ketone, fluorenone, 2,2-diethoxyacetophenone, 2,2-dimethoxy-2-phenyl-2-phenylacetophenone, 2-hydroxy-2-methyl-1-phenylpropan-1-one, 1-[4-(2-hydroxyethoxy)-phenyl]-2-hydroxy-2-methyl-1-propan-1-one, p-t-butyldichloroacetophenone, thioxanthone, 2-methylthioxanthone, 2-chlorothioxanthone, 2-isopropylthioxanthone, 2,4-diethylthioxanthone, 2,4-dichlorothioxanthone, benzyldimethylketanol, benzylmethoxyethylacetal, benzoin, benzoinmethyl ether, benzoinethyl ether, benzoinisopropyl ether, benzoinbutyl ether, anthraquinone, 2-t-butylanthraquinone, 2-amylanthraquinone, β-chloroanthraquinone, anthrone, benzanthrone, dibenzosuberone, methylene anthrone, 4-azidebenzalacetophenone, 2,6-bis(p-azidobenzylidene)cyclohexanone, 2,6-bis(p-azidobenzylidene)-4-methylcyclohexanone, 2-phenyl-1,2-butadione-2-(o-methoxycarbonyl)oxime, 1-phenyl-1,2-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, 2-methyl-[4-(methylthio)phenyl]-2-morpholino-1-propan-1-one, 2-benzyl-2-dimethylamino-1-(4-morpholinophenyl)-butanone, naphthalene sulfonyl chloride, quinoline sulfonyl chloride, N-phenylthioacridone, 4,4-azobisisobutyronitrile, diphenyl disulfide, benzthiazole disulfide, triphenylphosphine, 2,4,6-trimethylbenzoyl-diphenyl-phosphine oxide, and bis(2,4,6-trimethylbenzoyl)-phenyl-phosphine oxide.

Specific examples of the sensitizing agent include 2-methylthioxanthone, 2-chlorothioxanthone, 2-isopropylthioxanthone, 2,4-diethylthioxanthone, 2,4-dichlorothioxanthone, 2,3-bis(4-diethylaminobenzal)cyclopentanone, 2,6-bis(4-dimethylaminobenzal)cyclohexanone, 2,6-bis(4-dimethylaminobenzal)-4-methylcyclohexanone, 4,4-bis(dimethylamino)-benzophenone (other name: Michler's ketone), 4,4-bis(diethylamino)-benzophenone, 4,4-bis(dimethylamino) chalcone, 4,4-bis(diethylamino)chalcone, p-dimethylaminocinnamylidene indanone, p-dimethylaminobenzylidene indanone, 2-(p-dimethylaminophenylvinylene)-isonaphthothiazole, 1,3-bis(4-dimethylaminobenzal)acetone, 1,3-carbonyl-bis(4-diethylaminobenzal) acetone, 3,3-carbonyl-bis(7-diethylaminocoumarine), N-phenyl-N-ethylethanolamine, N-phenylethanolamine, N-tolyldiethanolamine, methyl dimethylaminobenzoate, ethyl dimethylaminobenzoate, isoamyl dimethylaminobenzoate, methyl diethylaminobenzoate, ethyl diethylaminobenzoate, isoamyl diethylaminobenzoate, ethyl dieethylaminobenzoate, isoamyl diethylaminobenzoate, 3-phenyl-5-benzoyl thiotetrazole, and 1-phenyl-5-ethoxycarbonyl thiotetrazole.

In the ink included in the lithographic printing ink set of the present invention, one or more of the photopolymerization initiator or sensitizing agent can be used.

As the photopolymerization initiator is contained at 0.1% by mass or more in the ink included in the lithographic printing ink set of the present invention, favorable sensitivity is obtained, and therefore desirable. It is more preferable to contain the photopolymerization initiator at 1.0% by mass or more, and even more preferably at 3.0% by mass or more. Furthermore, from the viewpoint that the storage stability of the ink is enhanced, the photopolymerization initiator is contained at 20.0% by mass or less. It is more preferably 15.0% by mass or less, and even more preferably 10.0% by mass or less.

Furthermore, in case of adding a sensitizing agent, the content is preferably 0.1% by mass or more relative to the ink from the viewpoint of obtaining favorable sensitivity. The content is more preferably 1.0% by mass or more, and even more preferably at 3.0% by mass or more. Furthermore, from the viewpoint that the storage stability of the ink is enhanced, the content is 20.0% by mass or less. It is more preferably 15.0% by mass or less, and even more preferably 10.0% by mass or less.

The ink included in the lithographic printing ink set of the present invention is preferably added with a polymerization inhibitor to enhance the stability during storage. Specific examples of the polymerization inhibitor include hydroquinone, monoether compound of hydroquinone, N-nitrosodiphenylamine, phenothiazine, p-t-butylcatechol, N-phenylnaphthylamine, 2,6-di-t-butyl-p-methyl phenol, chloranil, and pyrogallol. From the viewpoint of obtaining favorable storage stability, the addition amount of the polymerization inhibitor is preferably 0.01% by mass or more and 5.00% by mass or less relative to the ink.

Additives such as wax, antifoaming agent, or transfer improving agent can be used for the ink included in the lithographic printing ink set of the present invention, if necessary.

EXAMPLES

Hereinbelow, the present invention is described in greater detail by referring to Examples. However, the present invention is not limited to them.

<Starting Materials for Ink>

Resin 1: 0.55 equivalent of glycidyl methacrylate was subjected to addition reaction with the carboxyl group of a copolymer comprising 25% by mass of methyl methacrylate, 25% by mass of styrene, and 50% by mass of methacrylic acid to obtain resin 1 having an ethylenic unsaturated group and a hydrophilic group. Thus-obtained resin 1 had a weight average molecular weight of 34,000, an acid value of 105 mgKOH/g, and an iodine value of 2.0 mol/kg.

Resin 2: 0.7 equivalent of glycidyl methacrylate was subjected to addition reaction with the carboxyl group of a copolymer comprising 30% by mass of methyl methacrylate, 25% by mass of styrene, and 45% by mass of methacrylic acid to obtain resin 2 having an ethylenic unsaturated group and a hydrophilic group. Thus-obtained resin 2 had a weight average molecular weight of 27,000, an acid value of 70 mgKOH/g, and an iodine value of 2.3 mol/kg.

Resin 3: Resin 3 having a hydrophilic group, which consists of 42% by mass of methyl methacrylate, 25% by mass of styrene, and 33% by mass of methacrylic acid, was obtained. Thus-obtained resin 3 had a weight average molecular weight of 13,000 and an acid value of 183 mgKOH/g.

Resin 4: Resin 4 having a hydrophilic group, which consists of 45% by mass of methyl methacrylate, 20% by mass of styrene, and 35% by mass of methacrylic acid, was obtained. Thus-obtained resin 4 had a weight average molecular weight of 25,000 and an acid value of 232 mgKOH/g.

Resin 5: Isodap (manufactured by Daiso Chemical Co., Ltd., diallyl phthalate resin, no hydrophilic group, weight average molecular weight of 30,000 and an acid value of 0 mgKOH/g).

Polyfunctional (meth)acrylate 1: mixture of pentaerythritol triacrylate and pentaerythritol tetraacrylate, "Miramer" (registered trademark) M340 (manufactured by Miwon), with hydroxyl group, and hydroxyl value of 115 mgKOH/g Polyfunctional (meth)acrylate 2: mixture of pentaerythritol triacrylate and pentaerythritol tetraacrylate, "Aronix" (registered trademark) M-306 (manufactured by Toagosei Co., Ltd.), with hydroxyl group, and hydroxyl value of 171 mgKOH/g Polyfunctional (meth)acrylate 3: glycerin dimethacrylate "NK Ester" (registered trademark) 701 (manufactured by Shin Nakamura Co., Ltd.), with hydroxyl group, and hydroxyl value of 240 mgKOH/g Polyfunctional (meth)acrylate 4: mixture of dipentaerythritol pentaacrylate and dipentaerythritol hexaacrylate, "Aronix" (registered trademark) M-402 (manufactured by Toagosei Co., Ltd.), with hydroxyl group, and hydroxyl value of 28 mgKOH/g Polyfunctional (meth)acrylate 5: pentaerythritol tetraacrylate ethylene oxide adduct, "Miramer" (registered trademark) M4004 (manufactured by Miwon), without hydroxyl group.

Pigment 1: Carbon black MA8 (manufactured by Mitsubishi Chemical Corporation)

Pigment 2: Seika cyanine blue 4920 (manufactured by Dainichiseika Color & Chemicals Mfg. Co., Ltd.)

Pigment 3: Carmine 6B 1483LT (manufactured by Dainichiseika Color & Chemicals Mfg. Co., Ltd.)

Pigment 4: First yellow 2300 (manufactured by Dainichiseika Color & Chemicals Mfg. Co., Ltd.)

Surfactant 1: "Disperbyk" (registered trademark) 111 (manufactured by ALTANA), acid value of 129 mgKOH/g Surfactant 2: "Disperbyk" (registered trademark) 2152 (manufactured by ALTANA), acid value of 0 mgKOH/g Surfactant 3: "Plysurf" (registered trademark) A208F (manufactured by Daiichi Kogyo Co., Ltd.), acid value of 180 mgKOH/g Surfactant 4: "Disparlon" (registered trademark) DA-325 (manufactured by Kusumoto Chemicals, ltd.), acid value of 14 mgKOH/g Additive: lauryl acrylate (manufactured by Wako Pure Chemical Industries, Ltd.)

Photopolymerization initiator: "IRGACURE" (registered trademark) 907 (manufactured by BASF)

Polymerization inhibitor: p-methoxyphenol (manufactured by Wako Pure Chemical Industries, Ltd.)

Wax: fine powder of polytetrafluoroethylene "KTL-4N" (registered trademark) (manufactured by Kitamura Ltd.)

Emulsifying agent 1: polyoxyethylene lauryl ether "Emulgen" (registered trademark) 108 (manufactured by Kao Corporation), with HLB value of 12.1

Emulsifying agent 2: polyoxyethylene lauryl ether "EMALEX" (registered trademark) 505H (manufactured by Kao Corporation), with HLB value of 8.0

<Measurement of Weight Average Molecular Weight>

The weight average molecular weight of the resin is the value measured by gel permeation chromatography (GPC) using tetrahydrofuran for the mobile phase. HLC-8220 (manufactured by Tosoh Corporation) was used for GPC, and TSKgel SuperHM-H (manufactured by Tosoh Corporation), TSKgel SuperHM-H (manufactured by Tosoh Corporation), and TSKgel SuperH2000 (manufactured by Tosoh Corporation) were connected in this order and used as a column. For RI detection, measurement was carried out by using an RI detector installed in the above GPC. The calibration curve was established by using polystyrene standard materials, and the weight average molecular weight of a sample was calculated. Descriptions are given for the method for preparing samples for measurement. Samples were diluted in tetrahydrofuran to have concentration of 0.25% by mass, and the diluted solution was dissolved by stirring for 5 minutes at 100 rpm using a mix rotor (MIX-ROTAR VMR-5, manufactured by AS ONE Corporation). According to filtering using a 0.2 μm filter (Z227536-100EA, manufactured by SIGMA Corporation), the filtered solution was taken as a sample for measurement. Descriptions are given for the measurement conditions. The measurement was carried out by having the injection amount of L, analysis time of 30 minutes, flow rate of 0.4 mL/min, and column temperature of 40° C.

<Waterless Offset Printing Test>

A waterless offset printing plate (TAN-E manufactured by Toray Industries, Inc.) was mounted on an offset printer (Oliver 266EPZ manufactured by SAKURAI GRAPHIC SYSTEMS CORPORATION), and 5000 coated papers (OK Top coat, manufactured by Oji Paper Company) were printed by using each ink of Examples 1 to 8, and Comparative Example 1 to 9. The ink was cured by UV irradiation using a UV irradiation apparatus manufactured by Ushio (120 W/cm, 1 ultra-high pressure metal halide lamp) at a belt conveyer speed of 80 m/min to obtain a printed material. By transferring the inks in order of black ink (hereinbelow, it may be described as "black"), cyan ink (hereinbelow, it may be described as "navy"), magenta ink (hereinbelow, it may be described as "red"), and yellow ink (hereinbelow, it may be described as "yellow"), the printed material was obtained.

<Offset Printing Test>

An offset printing plate (XP-F manufactured by FUJIFILM Corporation) was mounted on an offset printer (Oliver 266EPZ, manufactured by SAKURAI GRAPHIC SYSTEMS CORPORATION), and 5000 coated papers (OK Top coat, manufactured by Oji Paper Company) were printed by using each ink of Example 9, and Comparative Examples 10 and 11 by using tap water admixed with 3% by weight of an etching solution (SOLAIA-505, manufactured by T&K TOKA) for the wetting water. The ink was cured by UV irradiation using a UV irradiation apparatus manufactured by Ushio (120 W/cm, 1 ultra-high pressure metal halide lamp) at a belt conveyer speed of 80 m/min to obtain a printed material. By transferring the inks in order of black, navy, red, and yellow, the printed material was obtained.

<Methods for Evaluation>

(1) Surface Tension

After cleaning the surface of a glass substrate (5 cm glass plate (thickness of 1 mm×length of 50 mm×width of 50 mm), manufactured by Ishida Rika) to perform a treatment for removing impurities, contact angle was measured for the ink applied onto the glass substrate by liquid dropping method using automatic contact angle device, DropMaster DM-501, manufactured by Kyowa Interface Science, Co., Ltd.), and thus surface tension of the ink was calculated. For the details, see those described above.

(2) Viscosity A cone plate (cone angle, 10; (p=40 mm) was mounted on Rheometer (MCR301 manufactured by Anton Paar), and the viscosity at 25° C. and 0.5 rpm, 20 rpm, or 50 rpm was measured for 0.15 ml of the ink measured by an ink pipette, and the measured viscosity was taken as the viscosity (A), the viscosity (B), and the viscosity (C), respectively. Furthermore, the viscosity ratio (C)/(B) was obtained.

(3) Scum Concentration

Navy concentration in the non-printing part of the printed material was evaluated by using a reflected densitometer (SpectroEye manufactured by GretagMacbeth) for the case when the navy concentration in the solid image of the printed material was 2.0. The scumming resistance was poor when the reflected density is more than 0.15, the scumming resistance was slightly favorable when the reflected density is more than 0.10 but 0.15 or less, the scumming resistance was favorable when the reflected density is 0.10 or less, and the scumming resistance was highly favorable when the reflected density is 0.05 or less.

(4) Gloss

The ink cured film on the printed material was measured for its gross value by using a precision gloss meter GM-26D (manufactured by MURAKAMI COLOR RESEARCH LABORATORY) at measurement angle of 60°. The gloss value of 25 or less is evaluated poor, while it is usable if the gloss value is more than 25 but less than 30. The gloss was evaluated good when the gloss value was at least 30 and excellent when the gloss value was at least 35.

(5) Tack Value

Tack value was measured by using 1.31 ml of ink, which has been taken using an ink pipette, and an inkometer (INKO-GRAPH TYPE V, manufactured by Tester Sangyo Co., Ltd.) at 38° C. with rotation number of 400 rpm. The measurement value obtained 1 minute after starting the measurement is taken as the tack value of the present invention.

Examples 1 to 3 and Comparative Examples 1 and 2

According to the composition shown in Table 1, a resin, polyfunctional (meth)acrylate, a pigment, a surfactant, an additive, a photopolymerization initiator, a polymerization inhibitor, and wax were weighed and passed through roller gap 1 of a three-roll mill "EXAKT" (registered trademark) M-80S (manufactured by EXAKT) five times at rate of 500 rpm to obtain black ink, cyan ink, magenta ink, and yellow ink. For the obtained lithographic printing ink, measurement of the surface tension, measurement of the viscosity, measurement of the tack, waterless printing test, and evaluation thereof were carried out as described in the above, and the surface tension, viscosity, scumming resistance, gloss, and tack value were evaluated. The results are shown in Table 1.

With regard to Examples 1 to 3, because the difference in surface tension between the inks is at most equal to 3.5 mN/m and also tack value of the black ink is 8.0 or less, gloss of the 4-color superimposed part was favorable. Furthermore, the difference in surface tension between the inks is smaller in order of Example 1, Example 2, and Example 3 and the gloss of the 4-color superimposed part is higher in order of Example 1, Example 2, and Example 3. Furthermore, because the surface tension is 45 mN/m or more and 60 mN/m or less and the viscosity (A) is 200 Pa·s or less, gloss of the single color part was favorable. Furthermore, because the viscosity (B) and the viscosity (C) are 5 Pa·s or more and the viscosity ratio (C)/(B) is 0.75 or more and 1.00 or less, scumming resistance was favorable.

With regard to Comparative Examples 1 and 2, because the maximum value of the difference in surface tension between the inks is more than 3.5 mN/m, gloss of the 4-color superimposed part was lower than Examples 1 to 3. The maximum value of the difference in surface tension between the inks is higher in Comparative Example 2 compared to Comparative Example 1, and the gloss of the 4-color super imposed part is lower in Comparative Example 2 compared to Comparative Example 1. Furthermore, in Comparative Examples 1 and 2, except part of them, the surface tension of the ink does not satisfy the condition of 45 mN/m or more and 60 mN/m or less, and thus gloss of the single color part was lower than Examples 1 to 3. Because Comparative Example 1 has higher viscosity (A) than Examples 1 to 3 and Comparative Example 2, it shows lower gloss of the single color part compared to Examples 1 to 3 and Comparative Example 2. Comparative Example 2 has lower viscosity (B) and lower viscosity (C) than Examples 1 to 3 and Comparative Example 1 and also lower viscosity ratio (C)/(B) than Examples 1 to 3 and Comparative Example 1, and thus scumming resistance was less favorable compared to Examples 1 to 3 and Comparative Example 1.

TABLE 1

|  |  | Example 1 |  |  |  | Example 2 |  |  |  | Example 3 |  |  |  |
|---|---|---|---|---|---|---|---|---|---|---|---|---|---|
|  |  | Black | Cyan | Magenta | Yellow | Black | Cyan | Magenta | Yellow | Black | Cyan | Magenta | Yellow |
| Composition (% by mass) | Resin 1 | 12.8 | 11.8 | 12.7 | 13.4 | — | — | — | — | — | — | — | — |
|  | Resin 2 | — | — | — | — | 13.0 | 11.9 | 13.0 | 13.8 | — | — | — | — |
|  | Resin 3 | — | — | — | — | — | — | — | — | 12.8 | 11.8 | 13.0 | 13.1 |
|  | Resin 4 | — | — | — | — | — | — | — | — | — | — | — | — |
|  | Resin 5 | — | — | — | — | — | — | — | — | — | — | — | — |
|  | Polyfunctional (meth)acrylate 1 | 22.8 | 24.2 | 25.6 | 26.7 | 22.7 | 24.2 | 25.5 | 26.5 | 22.8 | 24.2 | 25.5 | 26.8 |
|  | Polyfunctional (meth)acrylate 5 | 28.6 | 30.2 | 31.9 | 33.5 | 28.5 | 30.1 | 31.7 | 33.3 | 28.6 | 30.2 | 31.7 | 33.7 |
|  | Pigment 1 | 17.8 | — | — | — | 17.8 | — | — | — | 17.8 | — | — | — |
|  | Pigment 2 | — | 17.8 | — | — | — | 17.8 | — | — | — | 17.8 | — | — |
|  | Pigment 3 | — | — | 15.8 | — | — | — | 15.8 | — | — | — | 15.8 | — |
|  | Pigment 4 | — | — | — | 12.4 | — | — | — | 12.4 | — | — | — | 12.4 |
|  | Surfactant 1 | 3.0 | 3.0 | 3.0 | — | 3.0 | 3.0 | 3.0 | — | 3.0 | 3.0 | 3.0 | — |
|  | Surfactant 2 | — | — | — | 3.0 | — | — | — | 3.0 | — | — | — | 3.0 |
|  | Additives | 4.0 | 4.0 | 4.0 | 4.0 | 4.0 | 4.0 | 4.0 | 4.0 | 4.0 | 4.0 | 4.0 | 4.0 |
|  | Photopolymerization initiator | 9.9 | 7.9 | 5.9 | 5.9 | 9.9 | 7.9 | 5.9 | 5.9 | 9.9 | 7.9 | 5.9 | 5.9 |
|  | Polymerization inhibitor | 0.1 | 0.1 | 0.1 | 0.1 | 0.1 | 0.1 | 0.1 | 0.1 | 0.1 | 0.1 | 0.1 | 0.1 |
|  | Wax | 1.0 | 1.0 | 1.0 | 1.0 | 1.0 | 1.0 | 1.0 | 1.0 | 1.0 | 1.0 | 1.0 | 1.0 |
| Evaluation | Surface tension (mN/m) | 54.1 | 54.9 | 52.5 | 54.9 | 50.8 | 51.0 | 48.7 | 51.4 | 57.8 | 58.4 | 56.6 | 60.0 |
|  | Difference in surface tension (mN/m) |  | 2.4 |  |  |  | 2.7 |  |  |  | 3.4 |  |  |
|  | Viscosity (A) @ 0.5 rpm (Pa·s) | 53.2 | 47.3 | 96.6 | 29.9 | 50.1 | 42.1 | 88.9 | 29.9 | 33.6 | 32.4 | 54.1 | 28.4 |
|  | Viscosity (B) @ 20 rpm (Pa·s) | 9.8 | 13.4 | 18.6 | 13.5 | 8.9 | 12.3 | 16.2 | 14.3 | 9.7 | 9.6 | 12.3 | 9.3 |
|  | Viscosity (C) @ 50 rpm (Pa·s) | 8.1 | 11.8 | 14.6 | 12.5 | 7.8 | 11.0 | 12.3 | 11.2 | 8.0 | 7.4 | 9.7 | 7.5 |
|  | Viscosity ratio (C)/(B) | 0.82 | 0.88 | 0.78 | 0.93 | 0.88 | 0.89 | 0.76 | 0.78 | 0.82 | 0.77 | 0.79 | 0.81 |
|  | Scum concentration (resistance to scum) | 0.02 | 0.02 | 0.08 | 0.06 | 0.00 | 0.03 | 0.08 | 0.08 | 0.08 | 0.07 | 0.06 | 0.07 |
|  | Gloss (single color part) | 45 | 40 | 38 | 28 | 43 | 41 | 38 | 29 | 46 | 43 | 43 | 28 |
|  | Gloss (4-color superimposed part) |  | 40 |  |  |  | 37 |  |  |  | 37 |  |  |
|  | Tack value | 6.1 | 6.3 | 6.3 | 8.1 | 5.4 | 6.0 | 6.1 | 7.6 | 5.0 | 5.8 | 6.0 | 7.5 |

|  |  | Comparative Example 1 |  |  |  | Comparative Example 2 |  |  |  |
|---|---|---|---|---|---|---|---|---|---|
|  |  | Black | Cyan | Magenta | Yellow | Black | Cyan | Magenta | Yellow |
| Composition (% by mass) | Resin 1 | — | — | — | — | — | — | — | — |
|  | Resin 2 | — | — | — | — | — | — | — | — |
|  | Resin 3 | — | — | — | — | — | — | — | — |
|  | Resin 4 | 12.8 | 11.8 | 12.4 | 13.3 | — | — | — | — |
|  | Resin 5 | — | — | — | — | 12.8 | 11.8 | 12.7 | 13.5 |
|  | Polyfunctional (meth)acrylate 1 | 22.8 | 24.2 | 25.7 | 26.7 | 22.8 | 24.2 | 25.6 | 26.7 |
|  | Polyfunctional (meth)acrylate 5 | 28.6 | 30.2 | 32.1 | 33.6 | 28.6 | 30.2 | 31.9 | 33.4 |
|  | Pigment 1 | 17.8 | — | — | — | 17.8 | — | — | — |
|  | Pigment 2 | — | 17.8 | — | — | — | 17.8 | — | — |
|  | Pigment 3 | — | — | 15.8 | — | — | — | 15.8 | — |
|  | Pigment 4 | — | — | — | 12.4 | — | — | — | 12.4 |
|  | Surfactant 1 | 3.0 | 3.0 | 3.0 | — | 3.0 | 3.0 | 3.0 | — |
|  | Surfactant 2 | — | — | — | 3.0 | — | — | — | 3.0 |
|  | Additives | 4.0 | 4.0 | 4.0 | 4.0 | 4.0 | 4.0 | 4.0 | 4.0 |
|  | Photopolymerization initiator | 9.9 | 7.9 | 5.9 | 5.9 | 9.9 | 7.9 | 5.9 | 5.9 |
|  | Polymerization inhibitor | 0.1 | 0.1 | 0.1 | 0.1 | 0.1 | 0.1 | 0.1 | 0.1 |
|  | Wax | 1.0 | 1.0 | 1.0 | 1.0 | 1.0 | 1.0 | 1.0 | 1.0 |
| Evaluation | Surface tension (mN/m) | 60.8 | 61.1 | 57.4 | 61.2 | 44.3 | 38.3 | 42.1 | 42.4 |
|  | Difference in surface tension *(mN/m) |  | 3.8 |  |  |  | 6.0 |  |  |
|  | Viscosity (A) @ 0.5 rpm (Pa·s) | 212 | 228 | 267 | 175 | 39.8 | 38.7 | 75.8 | 25.9 |
|  | Viscosity (B) @ 20 rpm (Pa·s) | 20.3 | 23.1 | 26.7 | 23.7 | 9.8 | 9.2 | 10.5 | 8.0 |
|  | Viscosity (C) @ 50 rpm (Pa·s) | 18.6 | 19.2 | 21.4 | 21.9 | 5.4 | 4.5 | 7.3 | 4.6 |
|  | Viscosity ratio (C)/(B) | 0.92 | 0.83 | 0.80 | 0.92 | 0.55 | 0.49 | 0.70 | 0.58 |
|  | Scum concentration (resistance to scum) | 0.00 | 0.00 | 0.00 | 0.00 | 0.17 | 0.23 | 0.19 | 0.15 |

TABLE 1-continued

| | | | | | | | | |
|---|---|---|---|---|---|---|---|---|
| Gloss (single color part) | 32 | 30 | 30 | 23 | 34 | 31 | 31 | 25 |
| Gloss (4-color superimposed part) | | 27 | | | | 25 | | |
| Tack value | 8.6 | 9.0 | 8.9 | 10.3 | 4.8 | 5.3 | 5.4 | 6.3 |

Examples 1 and 4 and Comparative Examples 3 and 4

The same operation as Example 1 was carried out except that the composition shown in Table 2 is used, and thus black ink, cyan ink, magenta ink, and yellow ink were obtained. For the obtained lithographic printing ink, measurement of the surface tension, measurement of the viscosity, measurement of the tack, waterless printing test, and evaluation thereof were carried out as described in the above, and the surface tension, viscosity, scumming resistance, gloss, and tack value were evaluated. The results are shown in Table 2.

With regard to Examples 1 to 4, because the difference in surface tension between the inks is at most equal to 3.5 mN/m and also tack value of the black ink is 8.0 or less, gloss of the 4-color superimposed part was favorable. The difference in surface tension between the inks is smaller in Example 1 compared to Example 4, and the gloss of the 4-color superimposed part is higher in Example 1 compared to Example 4. Furthermore, because the surface tension is 45 mN/m or more and 60 mN/m or less and the viscosity (A) is 200 Pa·s or less for the inks of Examples 1 and 4, gloss of the single color part was favorable. Furthermore, because the viscosity (B) and the viscosity (C) are 5 Pa·s or more and the viscosity ratio (C)/(B) is 0.75 or more and 1.00 or less, scumming resistance was favorable.

With regard to Comparative Examples 3 and 4, because the difference in surface tension between the inks is more than 3.5 mN/m, gloss of the 4-color superimposed part was lower than Examples 1 and 4. The maximum value of the difference in surface tension between the inks is higher in Comparative Example 4 compared to Comparative Example 3, and the gloss of the 4-color superimposed part is lower in Comparative Example 4 compared to Comparative Example 3. Furthermore, in Comparative Examples 3 and 4, except part of them, the surface tension of the ink does not satisfy the condition of 45 mN/m or more and 60 mN/m or less, gloss of the single color part was lower than Examples 1 and 4. Because Comparative Example 3 has higher viscosity (A) than Examples 1 and 4 and Comparative Example 4, it shows lower gloss of the single color part compared to Examples 1 and 4 and Comparative Example 4. Comparative Example 4 has lower viscosity (B) and lower viscosity (C) than Examples 1 and 4 and Comparative Example 3 and also lower viscosity ratio (C)/(B) than Examples 1 and 4 and Comparative Example 3, and thus scumming resistance was less favorable compared to Examples 1 and 4 and Comparative Example 3.

TABLE 2

| | | Example 1 | | | | Example 4 | | | |
|---|---|---|---|---|---|---|---|---|---|
| | | Black | Cyan | Magenta | Yellow | Black | Cyan | Magenta | Yellow |
| Composition (% by mass) | Resin 1 | 12.8 | 11.8 | 12.7 | 13.4 | 13.0 | 11.6 | 12.8 | 13.5 |
| | Polyfunctional (meth)acrylate 1 | 22.8 | 24.2 | 25.6 | 26.7 | — | — | — | — |
| | Polyfunctional (meth)acrylate 2 | — | — | — | — | 22.8 | 24.3 | 25.6 | 26.7 |
| | Polyfunctional (meth)acrylate 3 | — | — | — | — | — | — | — | — |
| | Polyfunctional (meth)acrylate 4 | — | — | — | — | — | — | — | — |
| | Polyfunctional (meth)acrylate 5 | 28.6 | 30.2 | 31.9 | 33.5 | 28.4 | 30.3 | 31.8 | 33.4 |
| | Pigment 1 | 17.8 | — | — | — | 17.8 | — | — | — |
| | Pigment 2 | — | 17.8 | — | — | — | 17.8 | — | — |
| | Pigment 3 | — | — | 15.8 | — | — | — | 15.8 | — |
| | Pigment 4 | — | — | — | 12.4 | — | — | — | 12.4 |
| | Surfactant 1 | 3.0 | 3.0 | 3.0 | — | 3.0 | 3.0 | 3.0 | — |
| | Surfactant 2 | — | — | — | 3.0 | — | — | — | 3.0 |
| | Additives | 4.0 | 4.0 | 4.0 | 4.0 | 4.0 | 4.0 | 4.0 | 4.0 |
| | Photopolymerization initiator | 9.9 | 7.9 | 5.9 | 5.9 | 9.9 | 7.9 | 5.9 | 5.9 |
| | Polymerization inhibitor | 0.1 | 0.1 | 0.1 | 0.1 | 0.1 | 0.1 | 0.1 | 0.1 |
| | Wax | 1.0 | 1.0 | 1.0 | 1.0 | 1.0 | 1.0 | 1.0 | 1.0 |
| Evaluation | Surface tension (mN/m) | 54.1 | 54.9 | 52.5 | 54.9 | 57.0 | 56.6 | 53.8 | 56.8 |
| | Difference in surface tension (mN/m) | | | 2.4 | | | | 3.2 | |
| | Viscosity (A) @ 0.5 rpm (Pa · s) | 53.2 | 47.3 | 96.6 | 29.9 | 89.1 | 79.8 | 150 | 57.4 |
| | Viscosity (B) @ 20 rpm (Pa · s) | 9.8 | 13.4 | 18.6 | 13.5 | 14.4 | 16.5 | 20.4 | 16.0 |
| | Viscosity (C) @ 50 rpm (Pa · s) | 8.1 | 11.8 | 14.6 | 12.5 | 11.6 | 13.5 | 17.7 | 14.2 |
| | Viscosity ratio (C)/(B) | 0.82 | 0.88 | 0.78 | 0.93 | 0.81 | 0.82 | 0.87 | 0.89 |
| | Scum concentration (resistance to scum) | 0.02 | 0.02 | 0.08 | 0.06 | 0.01 | 0.02 | 0.05 | 0.06 |

TABLE 2-continued

| | | | | | | | | |
|---|---|---|---|---|---|---|---|---|
| Gloss (single color) | 45 | 40 | 38 | 28 | 42 | 39 | 35 | 27 |
| Gloss (in case of superimposing 4 colors) | | | 40 | | | | 36 | |
| Tack value | 6.1 | 6.3 | 6.3 | 8.1 | 6.7 | 6.9 | 7.1 | 8.8 |

| | | Comparative Example 3 | | | | Comparative Example 4 | | |
|---|---|---|---|---|---|---|---|---|
| | | Black | Cyan | Magenta | Yellow | Black | Cyan | Magenta | Yellow |

| | | Black | Cyan | Magenta | Yellow | Black | Cyan | Magenta | Yellow |
|---|---|---|---|---|---|---|---|---|---|
| Composition (% by mass) | Resin 1 | 13.0 | 11.8 | 12.7 | 13.4 | 12.8 | 11.8 | 12.7 | 13.4 |
| | Polyfunctional (meth)acrylate 1 | — | — | — | — | — | — | — | — |
| | Polyfunctional (meth)acrylate 2 | — | — | — | — | — | — | — | — |
| | Polyfunctional (meth)acrylate 3 | 22.7 | 24.2 | 25.6 | 26.7 | — | — | — | — |
| | Polyfunctional (meth)acrylate 4 | — | — | — | — | 22.8 | 24.2 | 25.6 | 26.7 |
| | Polyfunctional (meth)acrylate 5 | 28.5 | 30.2 | 31.9 | 33.5 | 28.6 | 30.2 | 31.9 | 33.5 |
| | Pigment 1 | 17.8 | — | — | — | 17.8 | — | — | — |
| | Pigment 2 | — | 17.8 | — | — | — | 17.8 | — | — |
| | Pigment 3 | — | — | 15.8 | — | — | — | 15.8 | — |
| | Pigment 4 | — | — | — | 12.4 | — | — | — | 12.4 |
| | Surfactant 1 | 3.0 | 3.0 | 3.0 | — | 3.0 | 3.0 | 3.0 | — |
| | Surfactant 2 | — | — | — | 3.0 | — | — | — | 3.0 |
| | Additives | 4.0 | 4.0 | 4.0 | 4.0 | 4.0 | 4.0 | 4.0 | 4.0 |
| | Photopolymerization initiator | 9.9 | 7.9 | 5.9 | 5.9 | 9.9 | 7.9 | 5.9 | 5.9 |
| | Polymerization inhibitor | 0.1 | 0.1 | 0.1 | 0.1 | 0.1 | 0.1 | 0.1 | 0.1 |
| | Wax | 1.0 | 1.0 | 1.0 | 1.0 | 1.0 | 1.0 | 1.0 | 1.0 |
| Evaluation | Surface tension (mN/m) | 61.6 | 61.0 | 57.9 | 60.8 | 42.5 | 43.8 | 39.6 | 43.4 |
| | Difference in surface tension (mN/m) | | | 3.7 | | | | 4.2 | |
| | Viscosity (A) @ 0.5 rpm (Pa·s) | 223 | 224 | 306 | 196 | 40.1 | 39.8 | 78.4 | 26.4 |
| | Viscosity (B) @ 20 rpm (Pa·s) | 22.1 | 24.3 | 28.6 | 22.6 | 7.9 | 10.0 | 11.3 | 9.8 |
| | Viscosity (C) @ 50 rpm (Pa·s) | 18.4 | 22.0 | 22.9 | 20.4 | 4.3 | 6.5 | 6.7 | 7.1 |
| | Viscosity ratio (C)/(B) | 0.83 | 0.91 | 0.80 | 0.90 | 0.54 | 0.65 | 0.59 | 0.72 |
| | Scum concentration (resistance to scum) | 0.01 | 0.00 | 0.01 | 0.00 | 0.20 | 0.18 | 0.23 | 0.14 |
| | Gloss (single color) | 32 | 31 | 29 | 25 | 38 | 35 | 32 | 25 |
| | Gloss (in case of superimposing 4 colors) | | | 28 | | | | 27 | |
| | Tack value | 9.2 | 9.3 | 9.8 | 10.7 | 5.3 | 5.8 | 5.7 | 7.4 |

Examples 1, 5 and 6 and Comparative Examples 5 to 7

The same operation as Example 1 was carried out except that the composition shown in Table 3 is used, and thus black ink, cyan ink, magenta ink, and yellow ink were obtained. For the obtained lithographic printing ink, measurement of the surface tension, measurement of the viscosity, measurement of the tack, waterless printing test, and evaluation thereof were carried out as described in the above, and the surface tension, viscosity, scumming resistance, gloss, and tack value were evaluated. The results are shown in Table 3.

With regard to Examples 1, 5, and 6, because the difference in surface tension between the inks is at most equal to 3.5 mN/m and also tack value of the black ink is 8.0 or less, gloss of the 4-color superimposed part was favorable. Furthermore, with regard to Examples 1, 5, and 6, the viscosity (A) is 200 Pa·s or less, and thus gloss of the 4-color superimposed part was favorable. Furthermore, because the surface tension of the ink is 45 mN/m or more and 60 mN/m or less in Example 1 while the surface tension of the ink does not satisfy the condition of 45 mN/m or more and 60 mN/m or less in Examples 5 and 6, gloss of the single color part was more favorable in Example 1 compared to Examples 5 and 6. Because the viscosity (B) and the viscosity (C) are 5 Pa·s or more and the viscosity ratio (C)/(B) is 0.75 or more and 1.00 or less in Examples 1, 5, and 6, scumming resistance was favorable.

With regard to Comparative Examples 5 to 7, because the difference in surface tension between the inks is more than 3.5 mN/m, gloss of the 4-color superimposed part was lower than Examples 1, 5, and 6. With regard to Comparative Examples 5 to 7, because the viscosity (A) is 200 Pa·s or less, gloss of the 1-color superimposed part was favorable. Meanwhile, because the surface tension of the ink is 45 mN/m or more and 60 mN/m or less in Comparative Example 5 while the surface tension of the ink does not satisfy the condition of 45 mN/m or more and 60 mN/m or less in Comparative Examples 6 and 7, gloss of the single color part was lower in Comparative Examples 6 and 7 compared to Comparative Example 5. With regard to Comparative Examples 5 to 7, because the viscosity (B) and the viscosity (C) are 5 Pa·s or more and the viscosity ratio (C)/(B) is 0.75 or more and 1.00 or less, scumming resistance was favorable.

TABLE 3

| | | Example 1 | | | | Example 5 | | | | Example 6 | | | |
|---|---|---|---|---|---|---|---|---|---|---|---|---|---|
| | | Black | Cyan | Magenta | Yellow | Black | Cyan | Magenta | Yellow | Black | Cyan | Magenta | Yellow |
| Composition (% by mass) | Resin 1 | 12.8 | 11.8 | 12.7 | 13.4 | 12.8 | 11.8 | 12.7 | 13.4 | 12.8 | 11.8 | 12.7 | 13.4 |
| | Polyfunctional (meth)acrylate 1 | 22.8 | 24.2 | 25.6 | 26.7 | 21.5 | 22.9 | 24.3 | 25.4 | 21.5 | 22.9 | 24.3 | 25.4 |
| | Polyfunctional (meth)acrylate 5 | 28.6 | 30.2 | 31.9 | 33.5 | 26.9 | 28.5 | 30.2 | 31.8 | 26.9 | 28.5 | 30.2 | 31.8 |
| | Pigment 1 | 17.8 | — | — | — | 17.8 | — | — | — | 17.8 | — | — | — |
| | Pigment 2 | — | 17.8 | — | — | — | 17.8 | — | — | — | 17.8 | — | — |
| | Pigment 3 | — | — | 15.8 | — | — | — | 15.8 | — | — | — | 15.8 | — |
| | Pigment 4 | — | — | — | 12.4 | — | — | — | 12.4 | — | — | — | 12.4 |
| | Surfactant 1 | 3.0 | 3.0 | 3.0 | — | — | — | — | — | — | 6.0 | — | — |
| | Surfactant 2 | — | — | — | 3.0 | — | — | — | 6.0 | — | — | — | — |
| | Surfactant 3 | — | — | — | — | — | — | — | — | 6.0 | — | 6.0 | 6.0 |
| | Surfactant 4 | — | — | — | — | 6.0 | 6.0 | 6.0 | — | — | — | — | — |
| | Additives | 4.0 | 4.0 | 4.0 | 4.0 | 4.0 | 4.0 | 4.0 | 4.0 | 4.0 | 4.0 | 4.0 | 4.0 |
| | Photopolymerization initiator | 9.9 | 7.9 | 5.9 | 5.9 | 9.9 | 7.9 | 5.9 | 5.9 | 9.9 | 7.9 | 5.9 | 5.9 |
| | Polymerization inhibitor | 0.1 | 0.1 | 0.1 | 0.1 | 0.1 | 0.1 | 0.1 | 0.1 | 0.1 | 0.1 | 0.1 | 0.1 |
| | Wax | 1.0 | 1.0 | 1.0 | 1.0 | 1.0 | 1.0 | 1.0 | 1.0 | 1.0 | 1.0 | 1.0 | 1.0 |
| Evaluation | Surface tension (mN/m) | 54.1 | 54.9 | 52.5 | 54.9 | 43.5 | 44.5 | 42.1 | 44.3 | 62.1 | 60.5 | 60.2 | 62.7 |
| | Difference in surface tension (mN/m) | | | 2.4 | | | | 2.4 | | | | 2.5 | |
| | Viscosity (A) @ 0.5 rpm (Pa·s) | 53.2 | 47.3 | 96.6 | 29.9 | 38.6 | 41.2 | 76.7 | 27.6 | 46.2 | 43.2 | 74.5 | 25.6 |
| | Viscosity (B) @ 20 rpm (Pa·s) | 9.8 | 13.4 | 18.6 | 13.5 | 9.4 | 13.2 | 15.8 | 11.2 | 10.2 | 13.7 | 16.1 | 11.9 |
| | Viscosity (C) @ 50 rpm (Pa·s) | 8.1 | 11.8 | 14.6 | 12.5 | 7.3 | 11.1 | 12.0 | 9.8 | 8.3 | 11.2 | 12.3 | 10.3 |
| | Viscosity ratio (C)/(B) | 0.82 | 0.88 | 0.78 | 0.93 | 0.78 | 0.84 | 0.76 | 0.88 | 0.81 | 0.82 | 0.76 | 0.87 |
| | Scum concentration (resistance to scum) | 0.02 | 0.02 | 0.08 | 0.06 | 0.04 | 0.03 | 0.08 | 0.07 | 0.03 | 0.04 | 0.09 | 0.07 |
| | Gloss (single color) | 45 | 40 | 38 | 28 | 39 | 36 | 32 | 25 | 38 | 35 | 33 | 25 |
| | Gloss (in case of superimposing 4 colors) | | | 40 | | | | 34 | | | | 33 | |
| | Tack value | 6.1 | 6.3 | 6.3 | 8.1 | 5.4 | 5.8 | 5.9 | 7.5 | 5.5 | 6.0 | 5.9 | 7.7 |

| | | Comparative Example 5 | | | | Comparative Example 6 | | | | Comparative Example 7 | | | |
|---|---|---|---|---|---|---|---|---|---|---|---|---|---|
| | | Black | Cyan | Magenta | Yellow | Black | Cyan | Magenta | Yellow | Black | Cyan | Magenta | Yellow |
| Composition (% by mass) | Resin 1 | 12.8 | 11.8 | 12.7 | 13.4 | 12.8 | 11.8 | 12.7 | 13.4 | 12.8 | 11.8 | 12.7 | 13.4 |
| | Polyfunctional (meth)acrylate 1 | 22.8 | 24.2 | 25.6 | 26.7 | 21.5 | 22.9 | 24.3 | 25.4 | 21.5 | 22.9 | 24.3 | 25.4 |
| | Polyfunctional (meth)acrylate 5 | 28.6 | 30.2 | 31.9 | 33.5 | 26.9 | 28.5 | 30.2 | 31.8 | 26.9 | 28.5 | 30.2 | 31.8 |
| | Pigment 1 | 17.8 | — | — | — | 17.8 | — | — | — | 17.8 | — | — | — |
| | Pigment 2 | — | 17.8 | — | — | — | 17.8 | — | — | — | 17.8 | — | — |
| | Pigment 3 | — | — | 15.8 | — | — | — | 15.8 | — | — | — | 15.8 | — |
| | Pigment 4 | — | — | — | 12.4 | — | — | — | 12.4 | — | — | — | 12.4 |
| | Surfactant 1 | — | 3.0 | 3.0 | — | — | — | — | — | — | 6.0 | — | — |
| | Surfactant 2 | — | — | — | 3.0 | — | — | — | — | — | — | — | — |
| | Surfactant 3 | — | — | — | — | — | — | — | 6.0 | 6.0 | — | 6.0 | 6.0 |
| | Surfactant 4 | 3.0 | — | — | — | 6.0 | 6.0 | 6.0 | — | — | — | — | — |
| | Additives | 4.0 | 4.0 | 4.0 | 4.0 | 4.0 | 4.0 | 4.0 | 4.0 | 4.0 | 4.0 | 4.0 | 4.0 |
| | Photopolymerization initiator | 9.9 | 7.9 | 5.9 | 5.9 | 9.9 | 7.9 | 5.9 | 5.9 | 9.9 | 7.9 | 5.9 | 5.9 |
| | Polymerization inhibitor | 0.1 | 0.1 | 0.1 | 0.1 | 0.1 | 0.1 | 0.1 | 0.1 | 0.1 | 0.1 | 0.1 | 0.1 |
| | Wax | 1.0 | 1.0 | 1.0 | 1.0 | 1.0 | 1.0 | 1.0 | 1.0 | 1.0 | 1.0 | 1.0 | 1.0 |
| Evaluation | Surface tension (mN/m) | 48.7 | 54.9 | 52.5 | 54.9 | 43.5 | 44.5 | 42.1 | 46.7 | 62.1 | 58.0 | 60.2 | 62.7 |
| | Difference in surface tension (mN/m) | | | 6.2 | | | | 4.6 | | | | 4.7 | |
| | Viscosity (A) @ 0.5 rpm (Pa·s) | 52.0 | 47.3 | 96.6 | 29.9 | 38.6 | 41.2 | 76.7 | 29.7 | 46.2 | 41.2 | 74.5 | 25.6 |
| | Viscosity (B) @ 20 rpm (Pa·s) | 8.9 | 13.4 | 18.6 | 13.5 | 9.4 | 13.2 | 15.8 | 12.3 | 10.2 | 13.5 | 16.1 | 11.9 |
| | Viscosity (C) @ 50 rpm (Pa·s) | 7.1 | 11.8 | 14.6 | 12.5 | 7.3 | 11.1 | 12.0 | 10.2 | 8.3 | 10.8 | 12.3 | 10.3 |
| | Viscosity ratio (C)/(B) | 0.80 | 0.88 | 0.78 | 0.93 | 0.78 | 0.84 | 0.76 | 0.83 | 0.81 | 0.80 | 0.76 | 0.87 |
| | Scum concentration (resistance to scum) | 0.03 | 0.02 | 0.08 | 0.06 | 0.04 | 0.03 | 0.08 | 0.09 | 0.03 | 0.05 | 0.09 | 0.07 |
| | Gloss (single color) | 45 | 40 | 38 | 28 | 39 | 36 | 32 | 27 | 38 | 38 | 33 | 25 |
| | Gloss (in case of superimposing 4 colors) | | | 26 | | | | 26 | | | | 27 | |
| | Tack value | 7.1 | 6.3 | 6.3 | 8.1 | 5.4 | 5.8 | 5.9 | 8.0 | 5.5 | 5.7 | 5.9 | 7.7 |

Examples 1, 7 and 8 and Comparative Examples 1, 8 and 9

The same operation as Example 1 was carried out except that the composition shown in Table 4 is used, and thus black ink, cyan ink, magenta ink, and yellow ink were obtained. For the obtained lithographic printing ink, measurement of the surface tension, measurement of the viscosity, measurement of the tack, waterless printing test, and evaluation thereof were carried out as described in the above, and the surface tension, viscosity, scumming resistance, gloss, and tack value were evaluated. The results are shown in Table 4.

With regard to Examples 1, 7, and 8, because the difference in surface tension between the inks is at most equal to 3.5 mN/m for each Example, gloss of the 4-color superimposed part was favorable. With regard to Examples 1, 7, and 8, because the surface tension of the ink is 45 mN/m or more and 60 mN/m or less and the viscosity (A) is 200 Pa·s or less, gloss of the single color part was favorable. Because the tack value of the black ink of Example 7 is lower than Example 1, gloss of the black single color part and gloss of the 4-color superimposed part were high but scumming resistance of the black ink was lower than Example 1. Because the tack value of the black ink of Example 8 is higher than Example 1, gloss of the black single color part and gloss of the 4-color superimposed part were low but scumming resistance of the black ink was higher than Example 1.

With regard to Comparative Examples 1, 8, and 9, because the difference in surface tension between the inks is more than 3.5 mN/m, gloss of the 4-color superimposed part was unfavorable. Furthermore, with regard to Comparative Examples 1, 8, and 9, except part of them, because the surface tension of the ink does not satisfy the condition of 45 mN/m or more and 60 mN/m or less and, except part of them, the viscosity (A) does not satisfy the condition of 200 Pa·s or less, gloss of the single color part was lower than Examples 1, 7, and 8. Because Comparative Examples 8 and 9 have lower tack value of the black ink compared to Comparative Example 1, gloss of the single color part and gloss of the 4-color superimposed part were high but scumming resistance of the black ink was lower than Comparative Example 1.

TABLE 4

|  |  | Example 1 | | | | Example 7 | | | |
| --- | --- | --- | --- | --- | --- | --- | --- | --- | --- |
|  |  | Black | Cyan | Magenta | Yellow | Black | Cyan | Magenta | Yellow |
| Composition (% by mass) | Resin 1 | 12.8 | 11.8 | 12.7 | 13.4 | 11.0 | 11.8 | 12.7 | 13.4 |
|  | Resin 4 | — | — | — | — | — | — | — | — |
|  | Polyfunctional (meth)acrylate 1 | 22.8 | 24.2 | 25.6 | 26.7 | 23.6 | 24.2 | 25.6 | 26.7 |
|  | Polyfunctional (meth)acrylate 5 | 28.6 | 30.2 | 31.9 | 33.5 | 29.6 | 30.2 | 31.9 | 33.5 |
|  | Pigment 1 | 17.8 | — | — | — | 17.8 | — | — | — |
|  | Pigment 2 | — | 17.8 | — | — | — | 17.8 | — | — |
|  | Pigment 3 | — | — | 15.8 | — | — | — | 15.8 | — |
|  | Pigment 4 | — | — | — | 12.4 | — | — | — | 12.4 |
|  | Surfactant 1 | 3.0 | 3.0 | 3.0 | — | 3.0 | 3.0 | 3.0 | — |
|  | Surfactant 2 | — | — | — | 3.0 | — | — | — | 3.0 |
|  | Additives | 4.0 | 4.0 | 4.0 | 4.0 | 4.0 | 4.0 | 4.0 | 4.0 |
|  | Photopolymerization initiator | 9.9 | 7.9 | 5.9 | 5.9 | 9.9 | 7.9 | 5.9 | 5.9 |
|  | Polymerization inhibitor | 0.1 | 0.1 | 0.1 | 0.1 | 0.1 | 0.1 | 0.1 | 0.1 |
|  | Wax | 1.0 | 1.0 | 1.0 | 1.0 | 1.0 | 1.0 | 1.0 | 1.0 |
| Evaluation | Surface tension (mN/m) | 54.1 | 54.9 | 52.5 | 54.9 | 52.1 | 54.9 | 52.5 | 54.9 |
|  | Difference in surface tension (mN/m) |  | 2.4 | | |  | 2.8 | | |
|  | Viscosity (A) @ 0.5 rpm (Pa·s) | 53.2 | 47.3 | 96.6 | 29.9 | 36.8 | 47.3 | 96.6 | 29.9 |
|  | Viscosity (B) @ 20 rpm (Pa·s) | 9.8 | 13.4 | 18.6 | 13.5 | 8.5 | 13.4 | 18.6 | 13.5 |
|  | Viscosity (C) @ 50 rpm (Pa·s) | 8.1 | 11.8 | 14.6 | 12.5 | 5.4 | 11.8 | 14.6 | 12.5 |
|  | Viscosity ratio (C)/(B) | 0.82 | 0.88 | 0.78 | 0.93 | 0.64 | 0.88 | 0.78 | 0.93 |
|  | Scum concentration (resistance to scum) | 0.02 | 0.02 | 0.08 | 0.06 | 0.15 | 0.02 | 0.08 | 0.06 |
|  | Gloss (single color) | 45 | 40 | 38 | 28 | 47 | 40 | 38 | 28 |
|  | Gloss (in case of superimposing 4 colors) |  | 40 | | |  | 42 | | |
|  | Tack value | 6.1 | 6.3 | 6.3 | 8.1 | 4.7 | 6.3 | 6.3 | 8.1 |

|  |  | Example 8 | | | |
| --- | --- | --- | --- | --- | --- |
|  |  | Black | Cyan | Magenta | Yellow |
| Composition (% by mass) | Resin 1 | 14.6 | 11.8 | 12.7 | 13.4 |
|  | Resin 4 | — | — | — | — |
|  | Polyfunctional (meth)acrylate 1 | 22.0 | 24.2 | 25.6 | 26.7 |
|  | Polyfunctional (meth)acrylate 5 | 27.6 | 30.2 | 31.9 | 33.5 |
|  | Pigment 1 | 17.8 | — | — | — |
|  | Pigment 2 | — | 17.8 | — | — |
|  | Pigment 3 | — | — | 15.8 | — |
|  | Pigment 4 | — | — | — | 12.4 |

TABLE 4-continued

|  |  |  |  |  |  |
|---|---|---|---|---|---|
|  | Surfactant 1 | 3.0 | 3.0 | 3.0 | — |
|  | Surfactant 2 | — | — | — | 3.0 |
|  | Additives | 4.0 | 4.0 | 4.0 | 4.0 |
|  | Photopolymerization initiator | 9.9 | 7.9 | 5.9 | 5.9 |
|  | Polymerization inhibitor | 0.1 | 0.1 | 0.1 | 0.1 |
|  | Wax | 1.0 | 1.0 | 1.0 | 1.0 |
| Evaluation | Surface tension (mN/m) | 55.9 | 54.9 | 52.5 | 54.9 |
|  | Difference in surface tension (mN/m) |  | 3.4 |  |  |
|  | Viscosity (A) @ 0.5 rpm (Pa · s) | 71.3 | 47.3 | 96.6 | 29.9 |
|  | Viscosity (B) @ 20 rpm (Pa · s) | 13.2 | 13.4 | 18.6 | 13.5 |
|  | Viscosity (C) @ 50 rpm (Pa · s) | 11.2 | 11.8 | 14.6 | 12.5 |
|  | Viscosity ratio (C)/(B) | 0.85 | 0.88 | 0.78 | 0.93 |
|  | Scum concentration (resistance to scum) | 0.01 | 0.02 | 0.08 | 0.06 |
|  | Gloss (single color) | 38 | 40 | 38 | 28 |
|  | Gloss (in case of superimposing 4 colors) |  | 36 |  |  |
|  | Tack value | 8.4 | 6.3 | 6.3 | 8.1 |

|  |  | Comparative Example 1 | | | | Comparative Example 8 | | | |
|---|---|---|---|---|---|---|---|---|---|
|  |  | Black | Cyan | Magenta | Yellow | Black | Cyan | Magenta | Yellow |
| Composition (% by mass) | Resin 1 | — | — | — | — | — | — | — | — |
|  | Resin 4 | 12.8 | 11.8 | 12.4 | 13.3 | 12.0 | 11.8 | 12.4 | 13.3 |
|  | Polyfunctional (meth)acrylate 1 | 22.8 | 24.2 | 25.7 | 26.7 | 23.2 | 24.2 | 25.7 | 26.7 |
|  | Polyfunctional (meth)acrylate 5 | 28.6 | 30.2 | 32.1 | 33.6 | 29.0 | 30.2 | 32.1 | 33.6 |
|  | Pigment 1 | 17.8 | — | — | — | 17.8 | — | — | — |
|  | Pigment 2 | — | 17.8 | — | — | — | 17.8 | — | — |
|  | Pigment 3 | — | — | 15.8 | — | — | — | 15.8 | — |
|  | Pigment 4 | — | — | — | 12.4 | — | — | — | 12.4 |
|  | Surfactant 1 | 3.0 | 3.0 | 3.0 | — | 3.0 | 3.0 | 3.0 | — |
|  | Surfactant 2 | — | — | — | 3.0 | — | — | — | 3.0 |
|  | Additives | 4.0 | 4.0 | 4.0 | 4.0 | 4.0 | 4.0 | 4.0 | 4.0 |
|  | Photopolymerization initiator | 9.9 | 7.9 | 5.9 | 5.9 | 9.9 | 7.9 | 5.9 | 5.9 |
|  | Polymerization inhibitor | 0.1 | 0.1 | 0.1 | 0.1 | 0.1 | 0.1 | 0.1 | 0.1 |
|  | Wax | 1.0 | 1.0 | 1.0 | 1.0 | 1.0 | 1.0 | 1.0 | 1.0 |
| Evaluation | Surface tension (mN/m) | 60.8 | 61.1 | 57.4 | 61.2 | 59.7 | 61.1 | 57.4 | 61.2 |
|  | Difference in surface tension (mN/m) |  | 3.8 | | |  | 3.8 | | |
|  | Viscosity (A) @ 0.5 rpm (Pa · s) | 212 | 228 | 267 | 175 | 164 | 228 | 267 | 175 |
|  | Viscosity (B) @ 20 rpm (Pa · s) | 20.3 | 23.1 | 26.7 | 23.7 | 16.7 | 23.1 | 26.7 | 23.7 |
|  | Viscosity (C) @ 50 rpm (Pa · s) | 18.6 | 19.2 | 21.4 | 21.9 | 14.3 | 19.2 | 21.4 | 21.9 |
|  | Viscosity ratio (C)/(B) | 0.92 | 0.83 | 0.80 | 0.92 | 0.86 | 0.83 | 0.80 | 0.92 |
|  | Scum concentration (resistance to scum) | 0.00 | 0.00 | 0.00 | 0.00 | 0.01 | 0.00 | 0.00 | 0.00 |
|  | Gloss (single color) | 32 | 30 | 30 | 23 | 35 | 30 | 30 | 23 |
|  | Gloss (in case of superimposing 4 colors) |  | 27 | | |  | 28 | | |
|  | Tack value | 8.6 | 9.0 | 8.9 | 10.3 | 7.4 | 9.0 | 8.9 | 10.3 |

|  |  | Comparative Example 9 | | | |
|---|---|---|---|---|---|
|  |  | Black | Cyan | Magenta | Yellow |
| Composition (% by mass) | Resin 1 | — | — | — | — |
|  | Resin 4 | 10.0 | 11.8 | 12.4 | 13.3 |
|  | Polyfunctional (meth)acrylate 1 | 23.2 | 24.2 | 25.7 | 26.7 |
|  | Polyfunctional (meth)acrylate 5 | 29.0 | 30.2 | 32.1 | 33.6 |
|  | Pigment 1 | 17.8 | — | — | — |
|  | Pigment 2 | — | 17.8 | — | — |
|  | Pigment 3 | — | — | 15.8 | — |
|  | Pigment 4 | — | — | — | 12.4 |
|  | Surfactant 1 | 3.0 | 3.0 | 3.0 | — |
|  | Surfactant 2 | — | — | — | 3.0 |

TABLE 4-continued

|  |  |  |  |  |  |  |
|---|---|---|---|---|---|---|
|  |  | Additives | 4.0 | 4.0 | 4.0 | 4.0 |
|  |  | Photopolymerization initiator | 9.9 | 7.9 | 5.9 | 5.9 |
|  |  | Polymerization inhibitor | 0.1 | 0.1 | 0.1 | 0.1 |
|  |  | Wax | 1.0 | 1.0 | 1.0 | 1.0 |
|  | Evaluation | Surface tension (mN/m) | 56.4 | 61.1 | 57.4 | 61.2 |
|  |  | Difference in surface tension (mN/m) |  | 4.8 |  |  |
|  |  | Viscosity (A) @ 0.5 rpm (Pa·s) | 70.1 | 228 | 267 | 175 |
|  |  | Viscosity (B) @ 20 rpm (Pa·s) | 9.4 | 23.1 | 26.7 | 23.7 |
|  |  | Viscosity (C) @ 50 rpm (Pa·s) | 6.2 | 19.2 | 21.4 | 21.9 |
|  |  | Viscosity ratio (C)/(B) | 0.66 | 0.83 | 0.80 | 0.92 |
|  |  | Scum concentration (resistance to scum) | 0.24 | 0.00 | 0.00 | 0.00 |
|  |  | Gloss (single color) | 39 | 30 | 30 | 23 |
|  |  | Gloss (in case of superimposing 4 colors) |  | 29 |  |  |
|  |  | Tack value | 4.9 | 9.0 | 8.9 | 10.3 |

Example 9 and Comparative Examples 10 and 11

The same operation as Example 1 was carried out except that the composition shown in Table 5 is used, and thus black ink, cyan ink, magenta ink, and yellow ink were obtained. For the obtained lithographic printing ink, measurement of the surface tension, measurement of the viscosity, measurement of the tack, waterless printing test, and evaluation thereof were carried out as described in the above, and the surface tension, viscosity, scumming resistance, gloss, and tack value were evaluated. The results are shown in Table 5.

With regard to Example 9, because the difference in surface tension between the inks is at most equal to 3.5 mN/m, gloss of the 4-color superimposed part was favorable. With regard to Comparative Examples 10 and 11, because the difference in surface tension between the inks is higher than 3.5 mN/m, gloss of the 4-color superimposed part was unfavorable. With regard to Example 9 and Comparative Examples 10 and 11, because the surface tension of the ink is 45 mN/m or more and 60 mN/m or less and the viscosity (A) is 200 Pa·s or less, gloss in single color part was favorable.

With regard to Comparative Example 11, because an emulsifying agent with HLB value of 8.0 is contained and a stable emulsified state cannot be obtained according to intake of wetting water by the ink during printing, printed material with suitable density cannot be obtained unless the ink supply amount is increased. As a result, scumming resistance was unfavorable. With regard to Example 9 and Comparative Example 10, because an emulsifying agent with HLB value of 12.1 is contained and a stable emulsified state can be obtained according to intake of wetting water by the ink during printing, printed material with suitable density can be obtained without increasing the ink supply amount. As a result, scumming resistance was favorable.

TABLE 5

|  |  | Example 9 | | | | Comparative Example 10 | | | | Comparative Example 11 | | | |
|---|---|---|---|---|---|---|---|---|---|---|---|---|---|
|  |  | Black | Cyan | Magenta | Yellow | Black | Cyan | Magenta | Yellow | Black | Cyan | Magenta | Yellow |
| Composition (% by mass) | Resin 1 | 12.8 | 11.8 | 12.7 | 13.4 | 12.8 | 11.8 | 12.7 | 13.4 | 12.8 | 11.8 | 12.7 | 13.4 |
|  | Polyfunctional (meth)acrylate 1 | 22.8 | 24.2 | 25.6 | 26.7 | 22.8 | 24.2 | 25.6 | 26.7 | 22.8 | 24.2 | 25.6 | 26.7 |
|  | Polyfunctional (meth)acrylate 5 | 28.6 | 30.2 | 31.9 | 33.5 | 28.6 | 30.2 | 31.9 | 33.5 | 28.6 | 30.2 | 31.9 | 33.5 |
|  | Pigment 1 | 17.8 | — | — | — | 17.8 | — | — | — | 17.8 | — | — | — |
|  | Pigment 2 | — | 17.8 | — | — | — | 17.8 | — | — | — | 17.8 | — | — |
|  | Pigment 3 | — | — | 15.8 | — | — | — | 15.8 | — | — | — | 15.8 | — |
|  | Pigment 4 | — | — | — | 12.4 | — | — | — | 12.4 | — | — | — | 12.4 |
|  | Surfactant 1 | 2.8 | 2.8 | 2.8 | — | 2.8 | 2.8 | — | — | 2.8 | 2.8 | — | — |
|  | Surfactant 2 | — | — | — | 2.8 | — | — | 2.8 | 2.8 | — | — | 2.8 | 2.8 |
|  | Emulsifying agent 1 | 0.2 | 0.2 | 0.2 | 0.2 | 0.2 | 0.2 | 0.2 | 0.2 | — | — | — | — |
|  | Emulsifying agent 2 | — | — | — | — | — | — | — | — | 0.2 | 0.2 | 0.2 | 0.2 |
|  | Additives | 4.0 | 4.0 | 4.0 | 4.0 | 4.0 | 4.0 | 4.0 | 4.0 | 4.0 | 4.0 | 4.0 | 4.0 |
|  | Photopolymerization initiator | 9.9 | 7.9 | 5.9 | 5.9 | 9.9 | 7.9 | 5.9 | 5.9 | 9.9 | 7.9 | 5.9 | 5.9 |
|  | Polymerization inhibitor | 0.1 | 0.1 | 0.1 | 0.1 | 0.1 | 0.1 | 0.1 | 0.1 | 0.1 | 0.1 | 0.1 | 0.1 |
|  | Wax | 1.0 | 1.0 | 1.0 | 1.0 | 1.0 | 1.0 | 1.0 | 1.0 | 1.0 | 1.0 | 1.0 | 1.0 |
| Evaluation | Surface tension (mN/m) | 54.4 | 55.2 | 53.0 | 55.8 | 54.4 | 55.2 | 51.1 | 55.8 | 53.8 | 54.7 | 50.3 | 55.0 |
|  | Difference in surface tension (mN/m) |  | 2.8 |  |  |  | 4.7 |  |  |  | 4.7 |  |  |
|  | Viscosity (A) @ 0.5 rpm (Pa·s) | 53.1 | 49.2 | 91.2 | 30.7 | 53.1 | 49.2 | 78.3 | 30.7 | 50.1 | 47.1 | 73.2 | 27.8 |
|  | Viscosity (B) @ 20 rpm (Pa·s) | 10.1 | 13.0 | 16.8 | 13.5 | 10.1 | 13.0 | 14.3 | 13.5 | 9.8 | 12.7 | 14.0 | 11.2 |

TABLE 5-continued

|  | Example 9 | | | | Comparative Example 10 | | | | Comparative Example 11 | | | |
| --- | --- | --- | --- | --- | --- | --- | --- | --- | --- | --- | --- | --- |
|  | Black | Cyan | Magenta | Yellow | Black | Cyan | Magenta | Yellow | Black | Cyan | Magenta | Yellow |
| Viscosity (C) @ 50 rpm (Pa·s) | 8.5 | 11.7 | 15.1 | 12.4 | 8.5 | 11.7 | 12.1 | 12.4 | 8.2 | 11.3 | 11.8 | 9.8 |
| Viscosity ratio (C)/(B) | 0.84 | 0.90 | 0.90 | 0.92 | 0.84 | 0.90 | 0.85 | 0.92 | 0.84 | 0.89 | 0.84 | 0.88 |
| Scum concentration (resistance to scum) | 0.03 | 0.01 | 0.04 | 0.04 | 0.03 | 0.01 | 0.06 | 0.04 | 0.11 | 0.12 | 0.17 | 0.18 |
| Gloss (single color) | 44 | 41 | 39 | 28 | 44 | 41 | 40 | 28 | 45 | 41 | 40 | 29 |
| Gloss (in case of superimposing 4 colors) | | | 40 | | | | 28 | | | | 28 | |
| Tack value | 6.3 | 6.5 | 6.4 | 8.4 | 6.3 | 6.5 | 6.1 | 8.4 | 6.1 | 6.4 | 6.0 | 8.1 |

The invention claimed is:

1. A method for manufacturing printed material comprising a step of coating on a substrate with a lithographic printing process: at least black ink for lithographic printing, cyan ink for lithographic printing, magenta ink for lithographic printing, and yellow ink for lithographic printing, wherein
a difference in surface tension between the inks to be coated on the substrate is at most equal to 3.5 mN/m; and
surface tension of the ink to be coated on the substrate is 45 mN/m or more and 60 mN/m or less.

2. The method for manufacturing printed material according to claim 1, wherein the coating on a substrate is carried out in order of the black ink for lithographic printing, cyan ink for lithographic printing, magenta ink for lithographic printing, and yellow ink for lithographic printing, and tack value (1 minute value) of the black ink for lithographic printing as measured by an inkometer at 38° C. and 400 rpm is 5.0 or more and 8.0 or less.

3. The method for manufacturing printed material according to claim 1, wherein the method includes a step of curing by active energy ray irradiation.

4. The method for manufacturing printed material according to claim 1, wherein viscosity (A) at rotation number of 0.5 rpm, viscosity (B) at rotation number of 20 rpm, and viscosity (C) at rotation number of 50 rpm of the ink to be coated on the substrate are all 5 Pa·s or more and 200 Pa·s or less as measured by a cone-plate rotation type viscometer at 25° C., and viscosity ratio (C)/(B) is 0.75 or more and 1.00 or less.

5. The method for manufacturing printed material according to claim 1, wherein the ink to be coated on the substrate contains a resin having a hydrophilic group, polyfunctional (meth)acrylate, a pigment, and a surfactant.

6. The method for manufacturing printed material according to claim 5, wherein the hydrophilic group of the resin having a hydrophilic group is any one of a carboxyl group, a sulfo group, a phosphoric acid group, and a hydroxyl group.

7. The method for manufacturing printed material according to claim 5, wherein acid value of the resin having a hydrophilic group is 30 mgKOH/g or more and 200 mgKOH/g or less.

8. The method for manufacturing printed material according to claim 5, wherein the polyfunctional (meth)acrylate has a hydroxyl group.

9. The method for manufacturing printed material according to claim 5, wherein hydroxyl value of the polyfunctional (meth)acrylate is 50 mgKOH/g or more and 200 mgKOH/g or less.

10. The method for manufacturing printed material according to claim 1, wherein gloss type coated paper is used as the substrate.

11. A lithographic printing ink set comprising at least black ink, cyan ink, magenta ink, and yellow ink, wherein
a difference in surface tension between the inks included in the lithographic printing ink set is at most equal to 3.5 mN/m; and
surface tension of the ink included in the lithographic printing ink set is 45 mN/m or more and 60 mN/m or less.

12. The lithographic printing ink set according to claim 11, wherein tack value (1 minute value) of the black ink included in the lithographic printing ink set as measured by an inkometer at 38° C. and 400 rpm is 5.0 or more and 8.0 or less.

13. The lithographic printing ink set according to claim 11, wherein viscosity (A) at rotation number of 0.5 rpm, viscosity (B) at rotation number of 20 rpm, and viscosity (C) at rotation number of 50 rpm of the ink included in the lithographic printing ink set are all 5 Pa·s or more and 200 Pa·s or less as measured by a cone-plate rotation type viscometer at 25° C., and viscosity ratio (C)/(B) is 0.75 or more and 1.00 or less.

14. The lithographic printing ink set according to claim 11, wherein the ink included in the lithographic printing ink set contains a resin having a hydrophilic group, polyfunctional (meth)acrylate, a pigment, a photopolymerization initiator, and a surfactant.

15. The lithographic printing ink set according to claim 14, wherein the hydrophilic group of the resin having a hydrophilic group is any one of a carboxyl group, a sulfo group, a phosphoric acid group, and a hydroxyl group.

16. The lithographic printing ink set according to claim 14, wherein the resin having a hydrophilic has an acid value of 30 mgKOH/g or more and 200 mgKOH/g or less.

17. The lithographic printing ink set according to claim 14, wherein the polyfunctional (meth)acrylate has a hydroxyl group.

18. The lithographic printing ink set according to claim 14, wherein hydroxyl value of the polyfunctional (meth)acrylate is 50 mgKOH/g or more and 200 mgKOH/g or less.

19. A printed material printed by using the lithographic printing ink set according to claim 11.

* * * * *